US011995377B2

(12) United States Patent
Liusaari et al.

(10) Patent No.: US 11,995,377 B2
(45) Date of Patent: May 28, 2024

(54) SYSTEMS AND METHODS OF ASSOCIATING MEDIA CONTENT WITH CONTEXTS

(71) Applicant: Spotify AB, Stockholm (SE)

(72) Inventors: Ari Liusaari, London (GB); Felice Mancino, Stockholm (SE); Chris Linnett, London (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/830,405

(22) Filed: Jun. 2, 2022

(65) Prior Publication Data

US 2022/0374196 A1 Nov. 24, 2022

Related U.S. Application Data

(63) Continuation of application No. 16/855,807, filed on Apr. 22, 2020, now Pat. No. 11,379,177, which is a
(Continued)

(51) Int. Cl.
*G06F 3/16* (2006.01)
*G11B 27/022* (2006.01)
(Continued)

(52) U.S. Cl.
CPC ............ *G06F 3/165* (2013.01); *G11B 27/022* (2013.01); *H04N 21/435* (2013.01);
(Continued)

(58) Field of Classification Search
CPC .. G06F 16/4387; G06F 3/0482; G06F 3/0484; G06F 16/683; G06F 16/686; G06F 3/048; G06F 16/48; G06F 16/435; G06F 3/04842; G06F 16/639; G06F 16/437; G06F 16/24578; G06F 3/165; G06F 16/24575; G11B 20/10; G11B 27/022; G11B 27/031; G11B 27/11; G06Q 30/0269; H04L 65/601; H04L 65/4069; H04L 67/10; G10H 1/0058; H04N 21/435; H04N 21/44224; H04N 21/458; H04N 21/462; H04N 21/4668;
(Continued)

(56) References Cited

U.S. PATENT DOCUMENTS 9,658,819 B2   5/2017  Wellman
10,671,338 B2  6/2020  Liusaari
(Continued)

*Primary Examiner* — Yogeshkumar Patel
(74) *Attorney, Agent, or Firm* — Merchant & Gould P.C.

(57) ABSTRACT

Systems, devices, apparatuses, components, methods, and techniques for saving media content to a context for later playback are provided. An example media-playback device for identifying and playing media content for a user traveling in a vehicle includes a context detecting device, a context-driven playback engine, and a media playback engine. Contexts are established by parameters that can be detected by a media-playback device. Contexts are situations that are defined by one or more locations, times, events, activities, people, and devices. Media content is saved to the contexts for later playback. The contexts are detected by the context detecting device, the associated media content is identified by the context-driven playback engine, and the media content is automatically played through the media playback engine, without additional input required by the user.

22 Claims, 20 Drawing Sheets

Related U.S. Application Data continuation of application No. 15/721,205, filed on Sep. 29, 2017, now Pat. No. 10,671,338.

(51) Int. Cl.

| | | |
|---|---|---|
| *H04N 21/435* | (2011.01) | |
| *H04N 21/442* | (2011.01) | |
| *H04N 21/45* | (2011.01) | |
| *H04N 21/458* | (2011.01) | |
| *H04N 21/462* | (2011.01) | |
| *H04N 21/466* | (2011.01) | |
| *H04N 21/472* | (2011.01) | |
| *H04N 21/475* | (2011.01) | |

(52) U.S. Cl.
CPC ..... *H04N 21/44224* (2020.08); *H04N 21/458* (2013.01); *H04N 21/462* (2013.01); *H04N 21/4668* (2013.01); *H04N 21/4755* (2013.01); *H04N 21/442* (2013.01); *H04N 21/4524* (2013.01); *H04N 21/47202* (2013.01)

(58) Field of Classification Search
CPC ............. H04N 21/4755; H04N 21/442; H04N 21/4524; H04N 21/47202; H04N 21/44222
See application file for complete search history.

(56) References Cited

U.S. PATENT DOCUMENTS

| | | | |
|---|---|---|---|
| 11,379,177 B2 | 7/2022 | Liusaari | |
| 2010/0138416 A1* | 6/2010 | Bellotti | ............... G06F 16/4393 |
| | | | 707/E17.014 |
| 2015/0199122 A1* | 7/2015 | Garmark | ................. H04L 67/01 |
| | | | 715/716 |
| 2015/0317353 A1* | 11/2015 | Zavesky | ............. G06F 16/4387 |
| | | | 707/736 |
| 2016/0357506 A1 | 12/2016 | Alsina | |

* cited by examiner

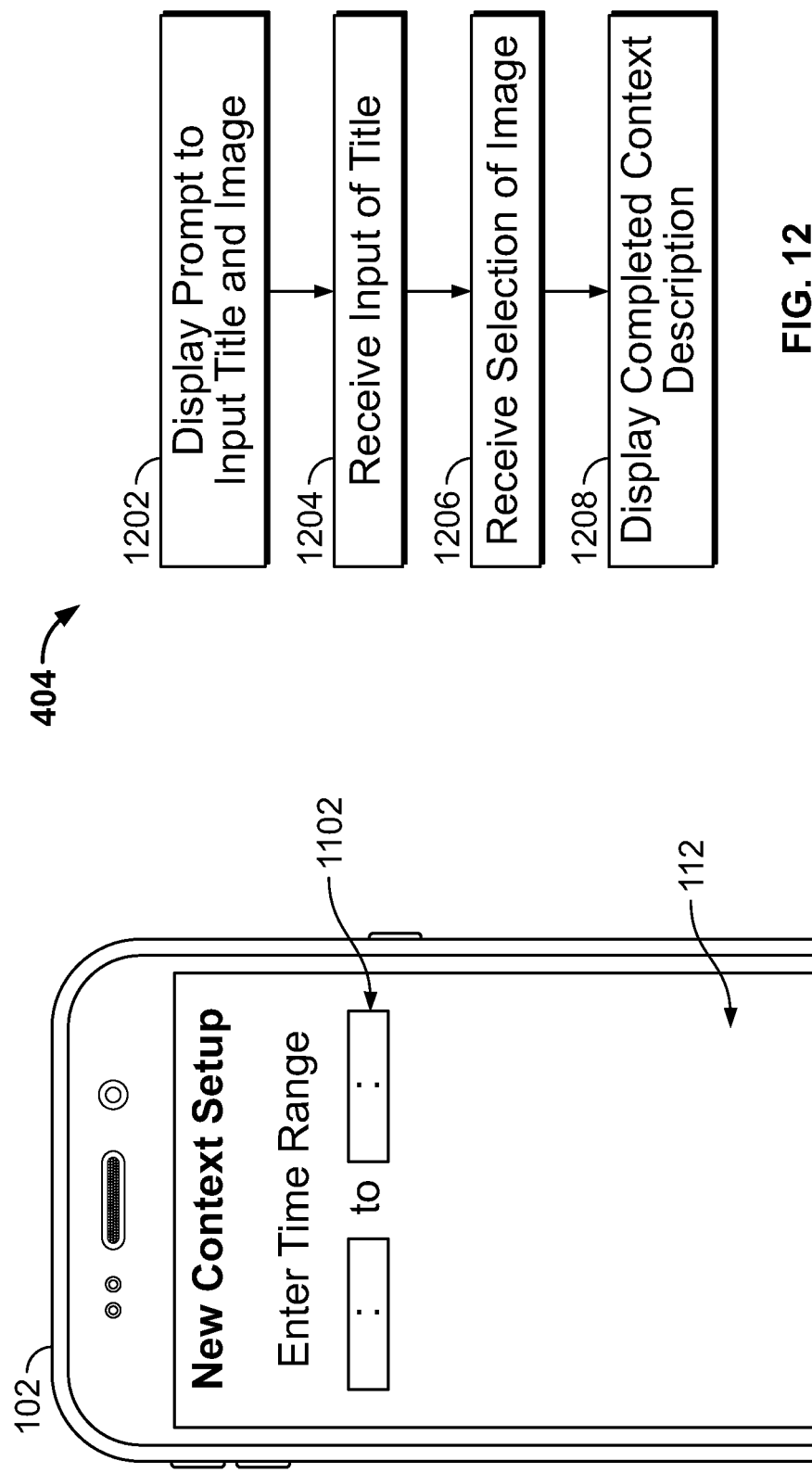

SYSTEMS AND METHODS OF ASSOCIATING MEDIA CONTENT WITH CONTEXTS

CROSS REFERENCE TO RELATED APPLICATION

This application is a continuation of U.S. patent application Ser. No. 16/855,807, filed on Apr. 22, 2020, which is a continuation of U.S. patent application Ser. No. 15/721,205, filed on Sep. 29, 2017, now U.S. Pat. No. 10,671,338, the disclosures of which are hereby incorporated by reference in their entireties. To the extent appropriate, a claim of priority is made to each of the above-disclosed applications.

BACKGROUND

Many people enjoy consuming media content while travelling, exercising, or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. Users often have different listening preferences depending on when or where they are listening to media content or based on which activity they are engaged in at the time. Additionally, users may discover or receive new media content that they wish to listen to at a later time. However, it is difficult to save that media content in such a way as to be able to access the media content for listening at a time that would be most appropriate or desirable for that user.

SUMMARY

In general terms, this disclosure is directed to saved media content for playback in a particular context or situation. In one possible configuration and by non-limiting limiting example, a media-playback device is configured to save media content to a context and later detect that context and automatically play the saved media content. Various aspects are described in this disclosure, which include, but are not limited to, the following aspects.

In one aspect, a media playback device comprises: a context determining device; a content output device; a processing device; a memory device encoding instructions that, when executed by the processing device, cause the media playback device to: receive a selection of media content, receive a selection of a context for playback of the media content, detect an occurrence of the context, and automatically play the saved media content after detecting the occurrence of the context.

In another aspect, a method of saving media content to a context for later playback on a media playback device comprises: receiving a selection of media content to save for later playback; receiving a selection of a context in which the media content will be played; detecting that the media playback device is in the selected context; and automatically playing the saved media content after detecting that the media playback device is in the selected context.

In yet another aspect, a system for saving media content to a context comprises: a mobile media playback device comprising a processing device and a memory device, the memory device storing a context application configured to receive inputs to link media content identifiers to a context for playback, record links made between contexts and the media content identifiers, and access the media content items identified by the media content identifiers when determined that the mobile media playback device is in the context for playback; and a media server comprising a processing device and a memory device, the memory device of the server storing an application configured to access the media content from a media content database and communicate the related media content to a mobile device.

In another aspect, one or more computer-readable media have computer-executable instructions embodied thereon that, when executed by one or more computing devices, cause the computing devices to: receive a selection of a first media content item; present to a user a plurality of contexts for playback, the plurality of contexts for playback including a first context for playback; receive a selection of the first context for playback; associate the first media content item with the first context for playback; detect an occurrence of the first context for playback; and automatically play the first media content item after detecting the occurrence of the first context for playback.

BRIEF DESCRIPTION OF THE DRAWINGS

FIG. 11 shows another example display of a user interface for selecting context parameters on the media-playback device of FIG. 1.

FIG. 12 illustrates an example method of receiving input to describe a context that is performed by some embodiments of the media-playback system of FIG. 1.

DETAILED DESCRIPTION

Figure 1:
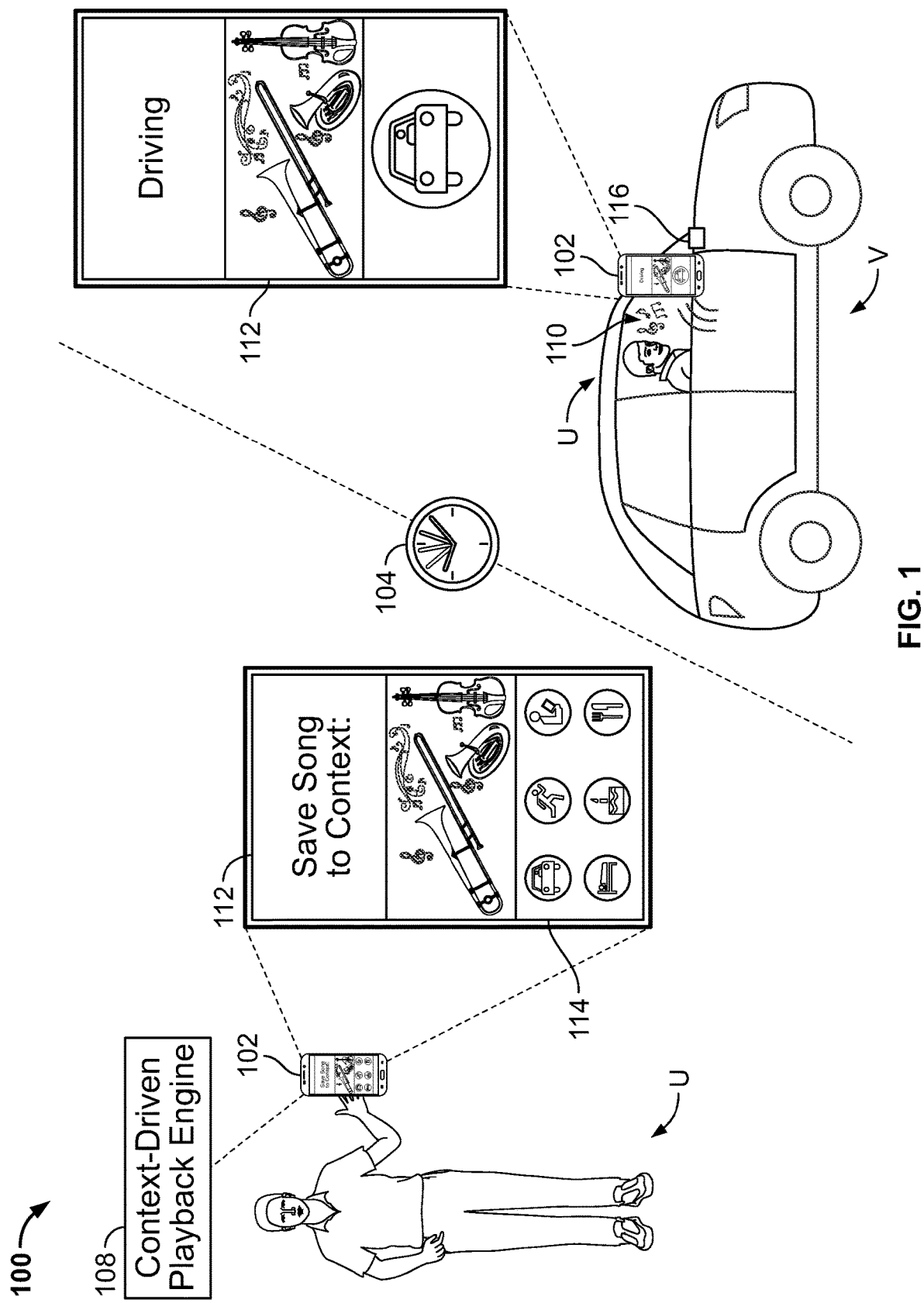
FIG. 1 illustrates an example media-playback system 100 for saving media to a context for later playback.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume different types of media content during various activities, at different times, and in different places. For example, one user might listen to jazz music during a morning commute in his car, classical music at work on his desktop computer, a sports podcast during the commute home in his car, rock music during a running workout on his headphones, and then fall asleep to nature sounds on speakers in his bedroom. Another user might wake up to pop music in her bedroom playing on Bluetooth speakers, listen to a news podcast on her headphones during a train commute while using a mobile device, listen to electronica music on her headphones using a laptop while studying during the day, then play a playlist for a birthday party that night through Bluetooth speakers in her living room. There are a multitude of different ways to experience media content and most people have different preferences for consuming media content depending on the situation.

It can be a challenge for users to quickly find and select the type of media content that they wish to consume at a given moment. For example, when a user finds new media content or is sent new media content, he or she may not wish to consume the media content at that particular time. For example, a user may be introduced to a new podcast while he is at work, but may wish to listen to the podcast on his commute home instead. Similarly, a user might discover a new artist that she likes and wants to be able to listen to that artist whenever she is running. It is desirable for users to be able to save media content for later playback in a more appropriate context or situation.

Embodiments disclosed herein address the challenges associated with finding, saving, and later playing back particular media content in the desired context for a user. In many instances, the media content is music content that is streamed on a media-playback device for a user to listen to. The media-playback device could be a mobile device or other computing device.

For example, in some embodiments, the media-playback device includes a context-driven playback engine. This context-driven playback engine can be useful to a user who receives or discovers new media content that the user wishes to listen to at a later time in a particular context. The context-driven playback engine allows the user to label or save the media content to a particular context so that the media content will automatically play for the user when the user in that particular context. For example, the user may save an album of music that the user finds while browsing at night that he or she wishes to listen to during his or her morning commute the next day. He or she could save the media content to the context of "driving" and the album will automatically play when the user is driving in his or her car the next day.

Consuming media content may include one or more of listening to audio content, watching video content, or consuming other types of media content. For ease of explanation, the embodiments described in this application are presented using specific examples. For example, audio content (and in particular music) is described as an example of one form of media consumption. However, it should be understood that the same concepts are similarly applicable to other forms of media consumption.

FIG. 1 illustrates an example media-playback system 100 for saving media content to a context for later playback. The example system 100 includes a media-playback device 102 being used by the user U. The media-playback device 102 includes a context-driven playback engine 108 and a user interface 112. In the scene on the left, the user U has found a song that he or she wishes to save for later playback. By selecting the drive icon 114, the user U saves the song to be played later in the user's vehicle V.

The dotted line 104 with the clock dividing the figure signifies the passage of time. The amount of time that passes between the scene on the left where the user is saving media content and the scene on the right where the user is playing back the saved media content could be any length of time. In some embodiments, the amount of time that passes is from 1 second to 10 years, from 5 seconds to 1 year, from 10 seconds to 1 month, from 30 seconds to 1 week, from 1 minute to 1 day, from 5 minutes to 10 hours, from 10 minutes to 2 hours, or from 15 minutes to 45 minutes. In some embodiments the length of time is greater than 1 minute, 5 minutes, or 1 hour.

The media-playback device 102 plays back media content items to produce media output 110. In some embodiments, such as the example shown in the scene on the right in FIG. 1, the media output 110 is played through another device such as vehicle-media playback system 116 that utilizes a wireless connection to communicate with the media-playback device 102. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user during various situations. The media content that is played back may be selected based on user input or may be selected without user input. The media content may be selected for playback with the aid of the context-driven playback engine 108 or by user selection. Although the media-playback device 102 is shown as a separate device in FIG. 1, the media-playback device 102 can also be integrated with the vehicle V (e.g., as part of a dash-mounted vehicle infotainment system).

A user interface 112 is generated for selecting and playing back media content items. In at least some embodiments, such as that shown in the scene on the left, the user interface 112 allows a user U to prompt the context-driven playback engine 108 to save media content for playback in particular contexts. The context-driven playback engine 108 then functions to recognize when the media-playback device 102 is in a particular context, such as a driving context as shown in the scene at the right. Upon detecting the driving context, the context-driven playback engine 108 causes the media-playback device 102 to play the saved media content as media output 110.

Figure 2:
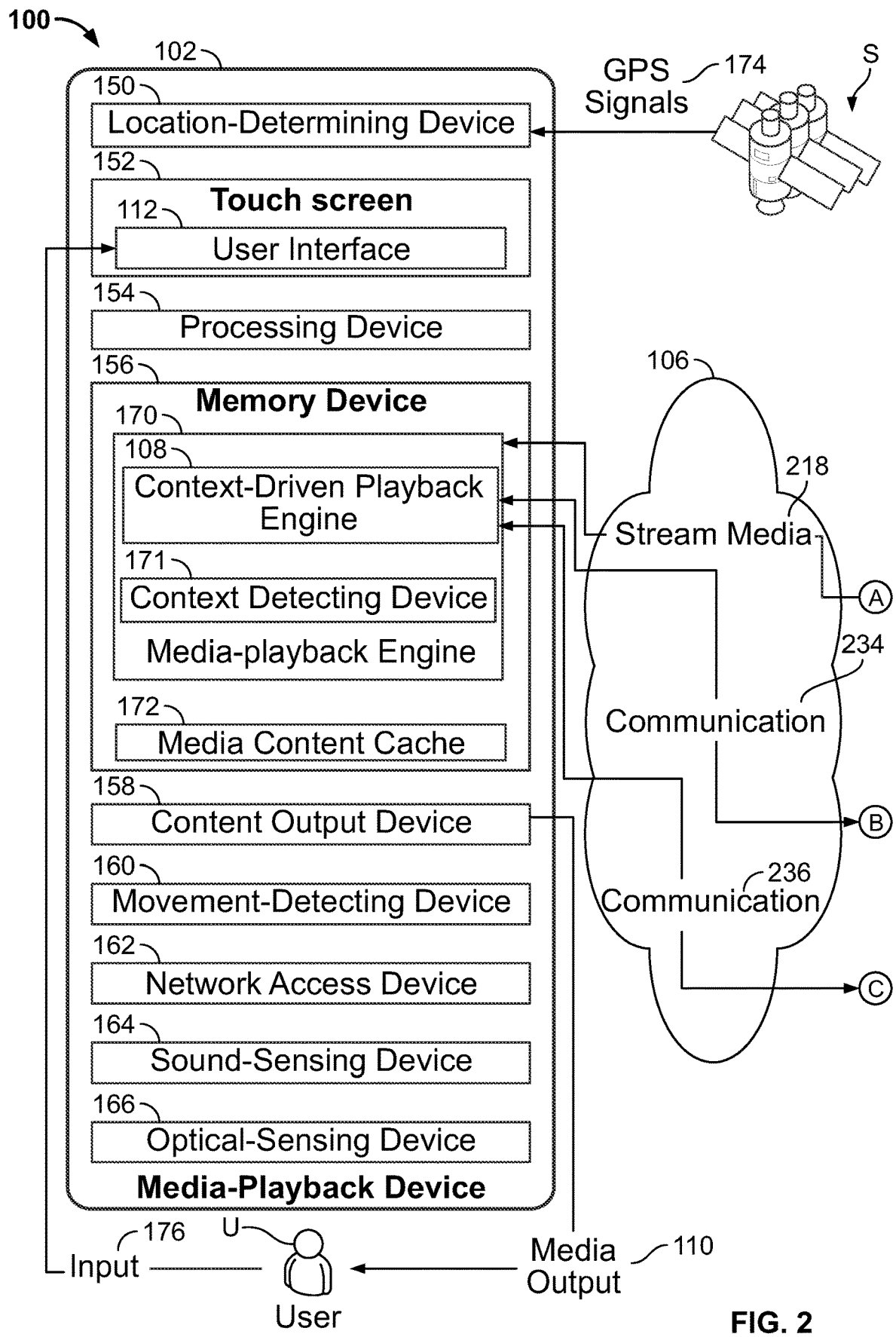
FIG. 2 is a schematic illustration of the example media-playback system of FIG. 1.
Figure 2:
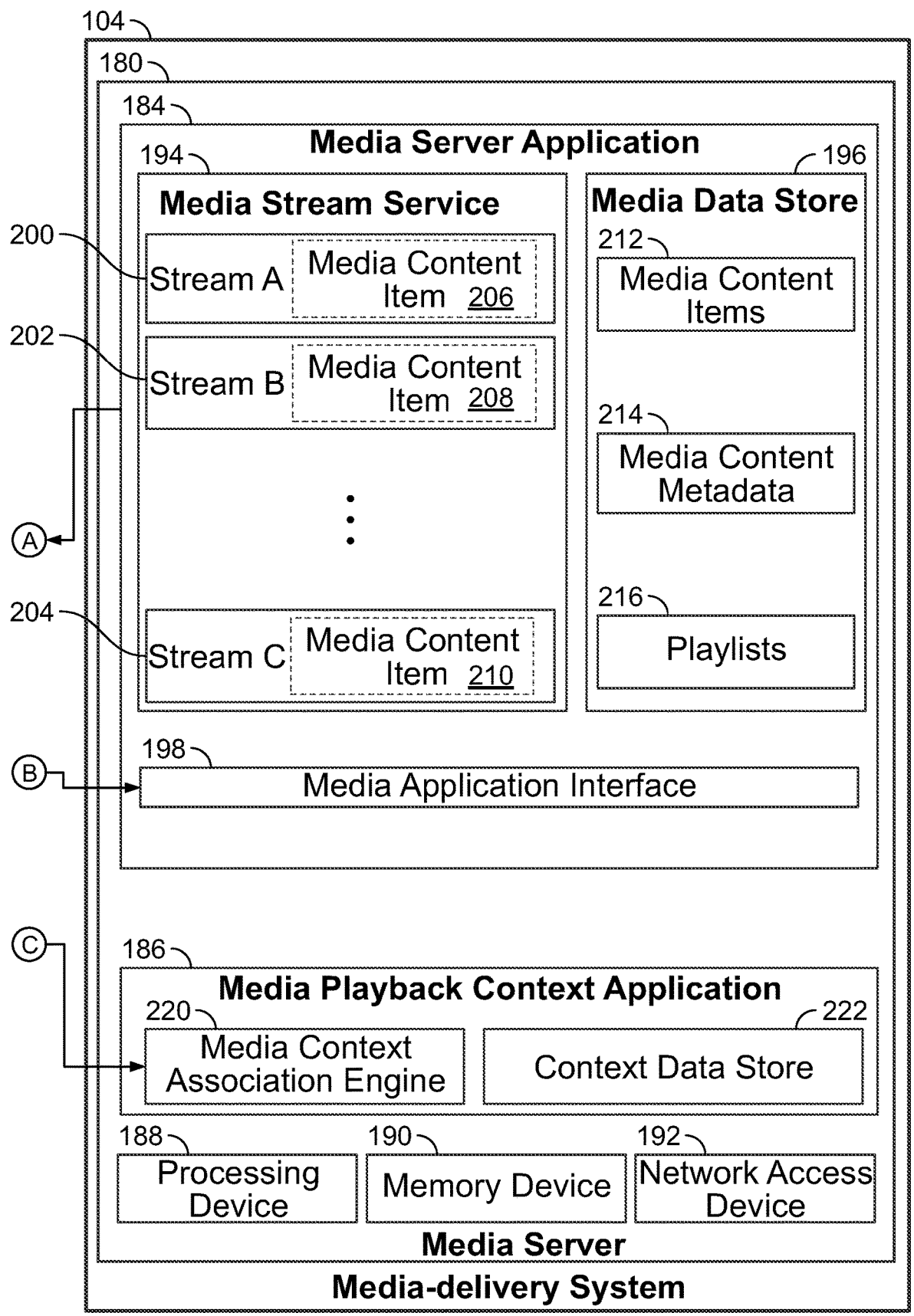

FIG. 2 is a schematic illustration of the example media-playback system 100 of FIG. 1. In FIG. 2, the media-playback device 102, a media-delivery system 104, and a network 106 are shown. Also shown are the user U and satellites S. The media-playback device 102 communicates with the media-delivery system 104 through the network 106.

As noted above, the media-playback device 102 plays media content items. In some embodiments, the media-playback device 102 plays media content items that are provided (e.g., streamed, transmitted, etc.) by a system external to the media-playback device 102 such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, Blu-Ray™ or DVD player, media player, stereo, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof. The location-determining device 150 may detect a context in instances where a physical location is used to describe a particular context. For example, in some embodiments, a context may have a particular geographic location associated with the context such as a particular address.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 112 for interacting with the media-playback device 102. In some embodiments, inputs received through the touch screen 152 are utilized to detect a context. For example, user input may be utilized to distinguish between two different contexts that otherwise have the same criteria for detection. In other embodiments, user input through the user interface 112 may be the only criteria for a context. Some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits. The processing device 154 executes instructions stored in the memory device 156.

The memory device 156 operates to store data and instructions. In some embodiments, the memory device 156 encodes instructions for a media-playback engine 170 that includes the context-driven playback engine 108. In some embodiments, the media-playback engine 170 selects and plays back media content and generates interfaces for selecting and playing back media content items. In some embodiments, the media-playback engine 170 works with the context-driven playback engine 108 to select and play media content items. As described above, the context-driven playback engine 108 saves media content to particular contexts and initiates playback of saved media content through the media-playback engine 170 when the media-playback device 102 has detected the desired context.

In at least some embodiments, the context-driven playback engine 108 saves media content to play back later in a particular situation. The user U selects one or more media content items to save and selects a particular context in which the user U wishes to access the media content later. The context-driven playback engine 108 detects when the media-playback device 102 is in a particular context by using the context-detecting device 171. The context-detecting device 171 may utilize input received through one or more of the location-determining device 150, touch screen 152, movement-detecting device 158, network access device 162, sound-sensing device 164, and optical-sensing device 166 to determine that the media-playback device 102 is in a particular context. Upon detecting a context, the context-driven playback engine 108 initiates playback of the saved media content automatically. No additional interaction from the user U is required to play the media content. The context-driven playback engine 108 may access the media content from the media-delivery system 104 which is then played by the media-playback engine 170.

Some embodiments of the memory device also include a media content cache 172. The media content cache 172 stores media-content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media-content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback).

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content 110. In some embodiments, the content output device 158 generates media output 110 for the user U. In some embodiments, the media output 110 is directed into an interior cabin of the vehicle V. Examples of the content output device 158 include a speaker assembly comprising one or more speakers, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones, speaker system, or vehicle head unit.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret the acceleration as indicating movement of the media-playback device 102 too. Detection of movement could indicate that the user is traveling in a vehicle or engaging in physical activity such as running. Detection of particular movement can indicate that a user is in a particular context, in some embodiments.

The network access device 162 operates to communicate with other computing devices over one or more networks, such as the network 106. Examples of the network access device 162 include one or more wired network interfaces and wireless network interfaces. Examples of wireless network interfaces include infrared, BLUETOOTH® wireless technology, 802.11a/b/g/n/ac, and cellular or other radio frequency interfaces. The network access device 162 can detect contexts by detecting particular networks or devices that can connect to the media-playback device. For example, the network access device 162 can detect Wi-fi networks or Bluetooth devices.

The network 106 is an electronic communication network that facilitates communication between the media-playback device 102 and the media-delivery system 104. The media-playback device 102 can also communicate with other devices through the network 106. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, stand-alone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., ambient sounds within the environment in which the media-playback device 102 is located). In some embodiments, the sound-sensing device 164 comprises one or more microphones. For example, the sound-sensing device 164 may capture a recording of audio external to the media-playback device 102 that indicates the context of the device. For example, background sounds of the ocean can indicate that the media-playback device is in a beach context.

These recordings may also be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc. In some embodiments, these inferences are used to detect if the media-playback device 102 is in a particular context.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a media playback context application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. In some embodiments, the media content metadata 214 indicates whether a particular user likes a particular media content item 212 or whether that media content item 212 is similar to other media content items 212 that a particular user likes or dislikes. The playlists 216 operate to identify one or more of the media content items 212 and assemble them into a programmed list. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The media playback context application 186 operates to record associations made between media content items and a context created by a user. In some embodiments, the context-driven playback engine 108 receives inputs from a user to establish the parameters for a context and communicates those parameters to the media context association engine 220. The media context association engine 220 communicates the context parameters to the context data store 222 for storage. The context-driven playback engine 108 can also communicate inputs from a user to save one or more media content items to an established context. The media context association engine 220 receives these inputs and records the associations between the media content items and the contexts in the context data store 222. The associations are recorded as metadata which links a media content item's identifying information with a tag or label for a particular context.

When a context is detected by the context-driven playback engine 108, the inputs received at the context-detecting device 171 are communicated to the media context association engine 220. The media context association engine 220 compares the inputs with the criteria stored in the context data store 222. The context with the matching criteria is identified as the detected context. The corresponding media content associated with the context is identified. The media context association engine 220 then communicates with the media data store 196 to access the media content associated with the context. The media stream service 194 then communicates the media content back to the media-playback engine 170 for playback.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media playback during travel, other embodiments are possible as well. For example, in some embodiments, the media-playback device 102 includes a media data store 196 and the media-playback device 102 is configured to select and playback media content items without accessing the media-delivery system 104. Further, in some embodiments, the media-playback device 102 operates to store previously streamed media content items in a local media data store (e.g., the media content cache 172).

Figure 3:
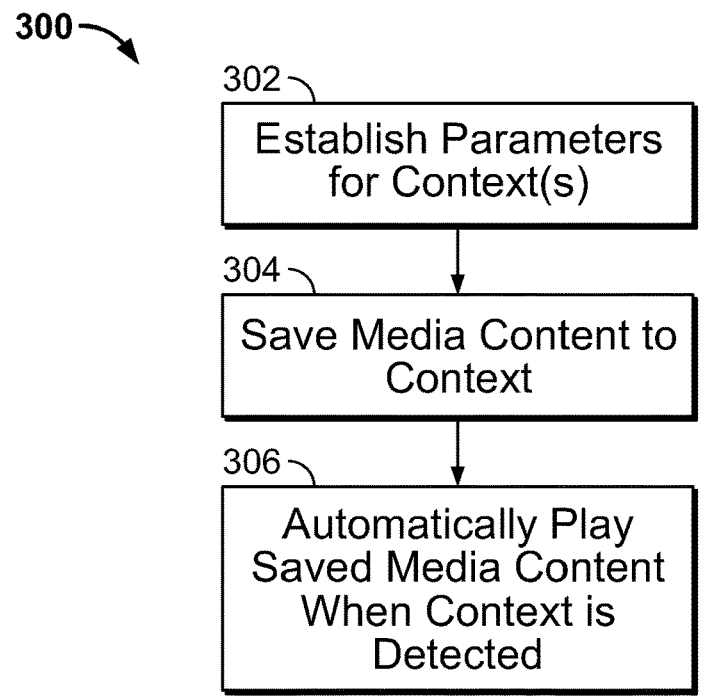
FIG. 3 illustrates an example method of saving media content to a context and later playing back the saved media content in the detected context performed by some embodiments of the context-driven playback engine.

FIG. 3 illustrates an example method 300 of saving media content to a context and later playing back the saved media content in the detected context performed by some embodiments of the context-driven playback engine 108. Such a method can be used, for example, when a user identifies media content that he or she wishes to consume at a later time in a particular situation. He or she can save the media content to a context using, for example, a media-playback device, such as the media-playback device 102 of FIG. 1. Later, when the user and the media-playback device 102 are in the selected context, the context-driven playback engine 108 will detect the context and automatically initiate playback of the saved media content through the media-playback device 102. In the example of FIG. 1, the saved context is "driving," so when the media-playback device 102 detects the Bluetooth connection to the vehicle media-playback system 116, the saved media content is automatically played as media output 110.

At operation 302, parameters for the context are established. In some embodiments, a user can establish the parameters for a context in advance of saving media content. In other embodiments, the user can set up a new context upon finding media content that the user wishes to save. Parameters for the context are described further with respect to FIG. 5-11 and can include one or more locations, times, devices, people, activities, and events. The criteria may be automatically detected by the media-playback device 102 or may require some input from the user. This detection process is further described with respect to FIGS. 28-30.

At operation 304, the media content is saved to a context. A user identifies media content that the user wishes to save for later playback. The user inputs which context to link or associate the media content identifying information with. The media content identifying information and the context information are recorded together to save the media content to the context. In some embodiments, the information is recorded in the context data store 222 of the media-delivery system 104. In other embodiments, the information is recorded in the memory device 156 of the media-playback device 102. This process is further described with respect to FIG. 23.

At operation 306, the media content is automatically played upon detection of the context. The context-detecting device 171 of the media-playback device 102 detects the context based on the parameters established in operation 302. In some embodiments, the context-driven playback engine 108 communicates the detected parameters to the media playback context application 186 to determine which media content to play. The media context association engine 220 references the detected parameters with the saved contexts in the context data store 222 and then communicates the identifying information for the corresponding media content to the media server application 184 which then streams the media content back to the media-playback engine 170. The media content is automatically delivered to the user U as media output 110 without additional interaction from the user. This process is further described with respect to FIGS. 25-30.

Figure 4:
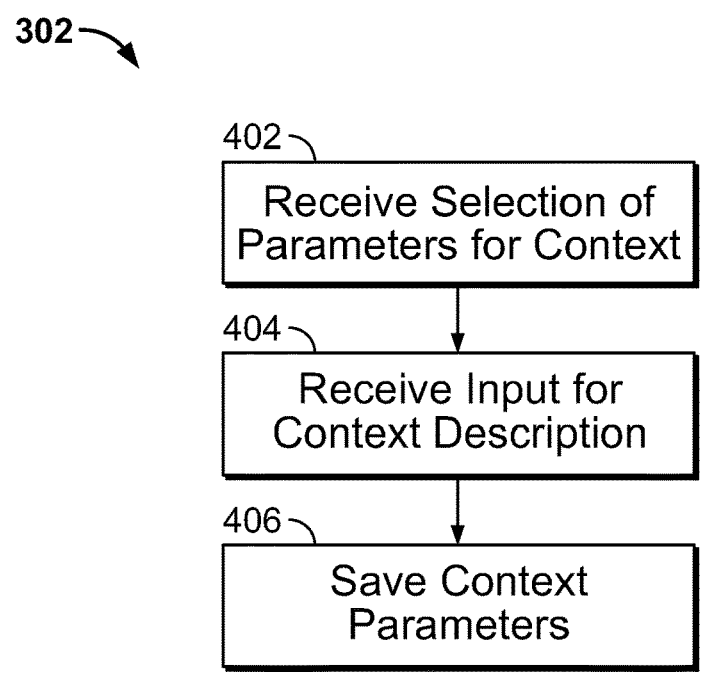
FIG. 4 illustrates an example method of establishing criteria for a new context performed by some embodiments of the media-playback system of FIG. 1.

FIG. 4 illustrates an example method 302 of establishing criteria for a new context. At operation 402, parameters are selected for the new context. The parameters define the way in which the context-driven playback engine 108 will establish that the media-playback device 102 is in a particular context. At operation 404, input for the context description is received. The context description is used to distinguish between contexts for the purpose of saving and accessing contexts. At operation 406 the context is saved. The context parameters and description are stored either in the media-playback device 102 or the media-delivery system 104. The method 302 of FIG. 4 is described in greater detail with respect to FIGS. 5-14).

Figure 5:
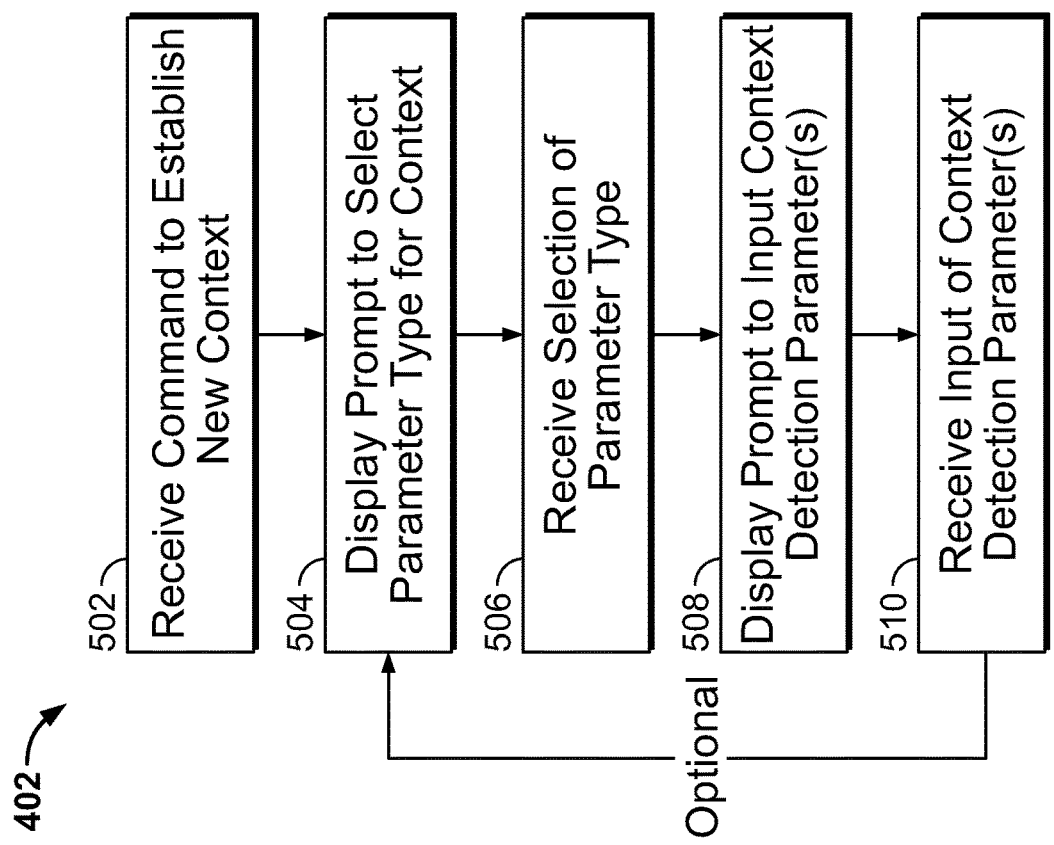
FIG. 5 illustrates an example method 402 of selecting criteria for a new context performed by some embodiments of the media-playback system of FIG. 1.
Figure 8:
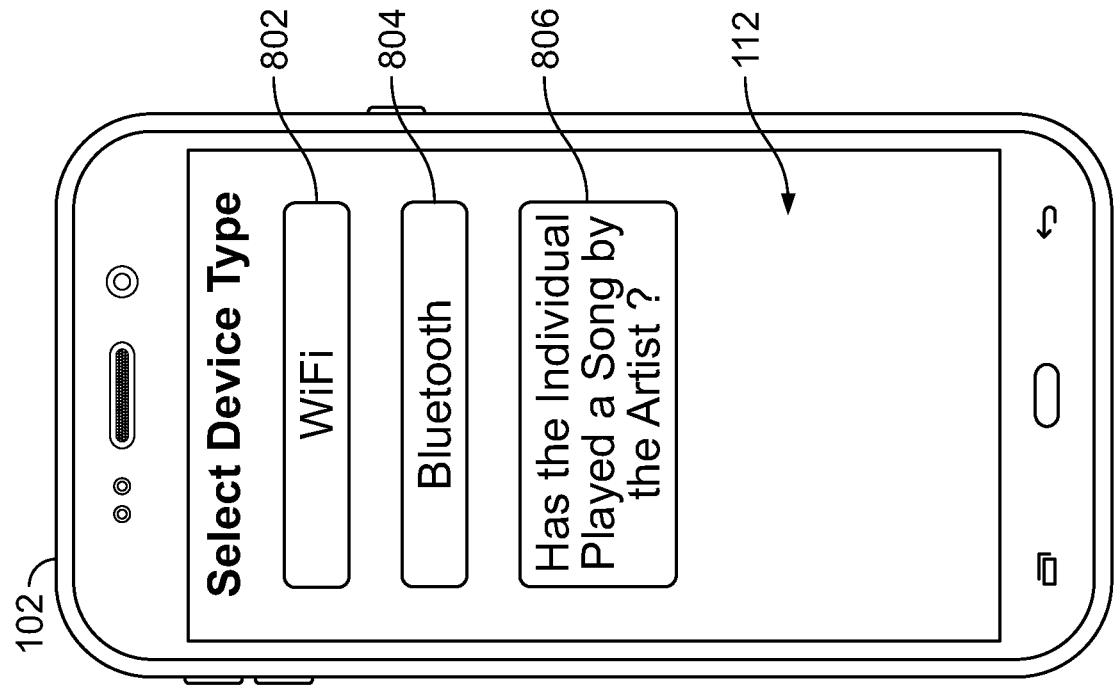
FIG. 8 shows an example display of a user interface for selecting context parameters on the media-playback device of FIG. 1.

FIG. 5 illustrates an example method 402 of selecting parameters for a new context. At operation 502, a command is received to establish a new context. In some embodiments, the media-playback device 102 receives input from the user U through the user interface 112 in the form of gestures or typing on the touch screen 152. In the example shown in FIG. 6, the user U has opened a settings menu on the user interface 112. The settings menu offers the option to edit an existing context by selecting the "Edit Contexts" button 602 or to establish a new context by selecting the "Add New Context" button 604. The user U may provide inputs in other ways such as through a keyboard, a mouse, and a voice command. The command to establish a new context is communicated to the context-driven playback engine 108 by selecting "Add New Context" 604.

At operation 504, a prompt is displayed to select a parameter type for the context. In some embodiments, the context-drive playback engine 108 generates a prompt that is displayed to the user U on the user interface 112. In the example shown in FIG. 7, the user interface 112 displays options for types of parameters including "Add Device" 702, "Add Event" 704, "Add Person" 706, "Add Time" 708, "Add Location" 710, and "Add Activity" 712. The parameter types categorize various criteria that may be utilized to detect and identify a particular context.

Devices include the media-playback device 102 as well as external devices to the media-playback device 102 that communicate with the media-playback device 102 through a wireless or wired connection. In some embodiments, the user can specify a particular media-playback device which the media content will be played from as a parameter for a context. For example, a user could establish one context for a mobile phone and a different context for a laptop computer, both of which function as media-playback devices. External devices may include speakers, headphones, vehicle media-playback systems, and other media-playback devices that connect to the media-playback device 102 through Bluetooth, Wi-Fi, and other wireless connections. The external devices can also connect to the media-playback device 102 through a wired connection.

Events are situations having a particular purpose and a particular date. In some embodiments, the events have a particular date and time. In some embodiments, the events may be defined by connecting to the user's online calendar. Examples of events can include birthday parties, holidays, dinner parties, and other events having a defined time and purpose. Selecting an event as a parameter for a context will provide date and time limitations on the context detection. In some embodiments, the event can have a defined location. Event parameters may be combined with other parameters to more accurately define a context.

Adding a person for context parameters limits playback of media content to when that person is nearby the media-playback device 102. The parameters for determining when the person is present can include wireless or wired connections between the media-playback device 102 and a device operated by the person. In other embodiments, selecting a person as a parameter allows a user to save media content to listen to with the person and the context is detected by user input that indicates that the selected person is present.

Time parameters typically defined by selecting a time range. In some embodiments, only a start time is required. In some embodiments, the time can be a repeating occurrence on a daily, weekly, or monthly basis. For example, a context could be established for a single date and time in the future or to recur every date at a particular time. Time parameters can be combined with other parameters to more accurately define a context.

Location parameters are defined by inputting a particular location such as GPS coordinates or an address. In some embodiments, location is detected by GPS or other location-detecting means such as connections to particular Wi-Fi networks. For example, the media-playback device 102 can determine that you are in your home either by GPS or by detecting your home Wi-Fi connection.

Activities are particular movements or tasks that are taking place around the media-playback device 102. Typically, the user is engaging in an activity that involves movement of some sort that can be detected by the media-playback device through the movement-detecting device 160. In some embodiments, an accelerometer determines if the media-playback device 102 is moving in a certain way or at a certain speed. For example, the accelerometer can determine if the user is running or walking. In another example, the accelerometer can detect if the user is traveling in a vehicle to detect driving or commuting activities.

Figure 7:
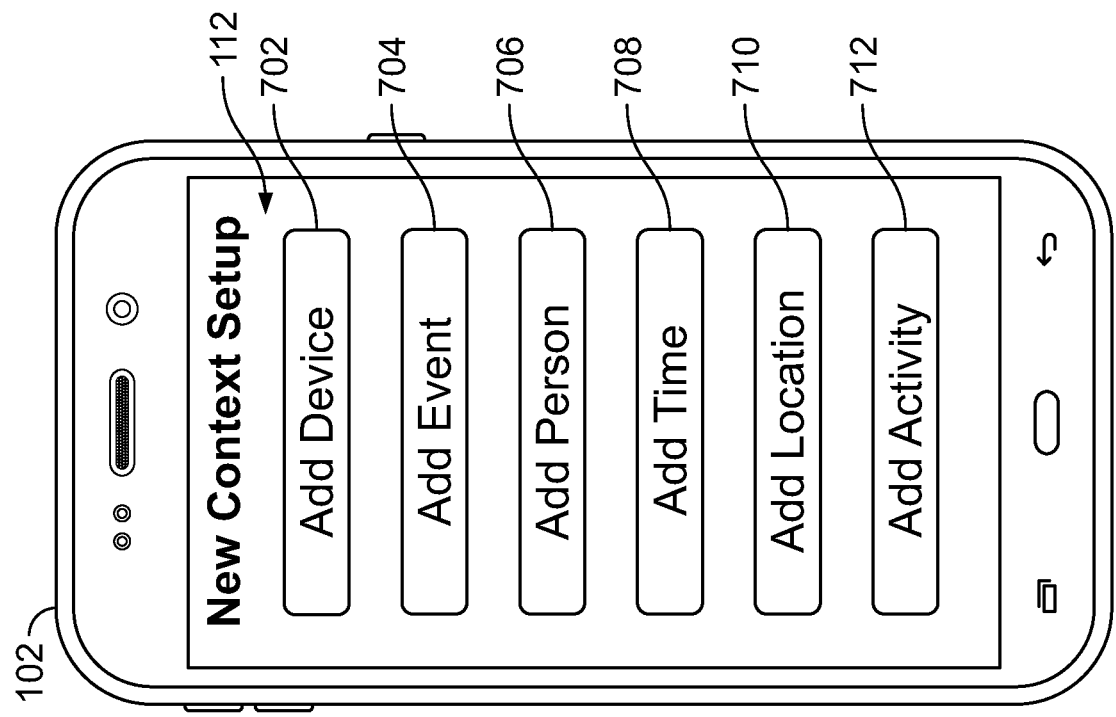
FIG. 7 shows an example display of a user interface for selecting a context type on the media-playback device of FIG. 1.

At operation 506 of FIG. 5, a selection of a parameter type is received. In the example of FIG. 7, the user selects "Add Device" 702.

At operation 508, a prompt is displayed to input one or more context detection parameters for the parameter type. At operation 510, input of the context detection parameters is received. In the example shown in FIG. 8, the user interface 112 presents input options to select parameters for the device that is being added. In this example, the type of device is being selected from "WiFi" 802, "Bluetooth" 804, and "Wired Connection" 806. In this example, the user selects "Bluetooth" 804 which causes the user interface 112 to display a follow up prompt shown in FIG. 9.

Figure 9:
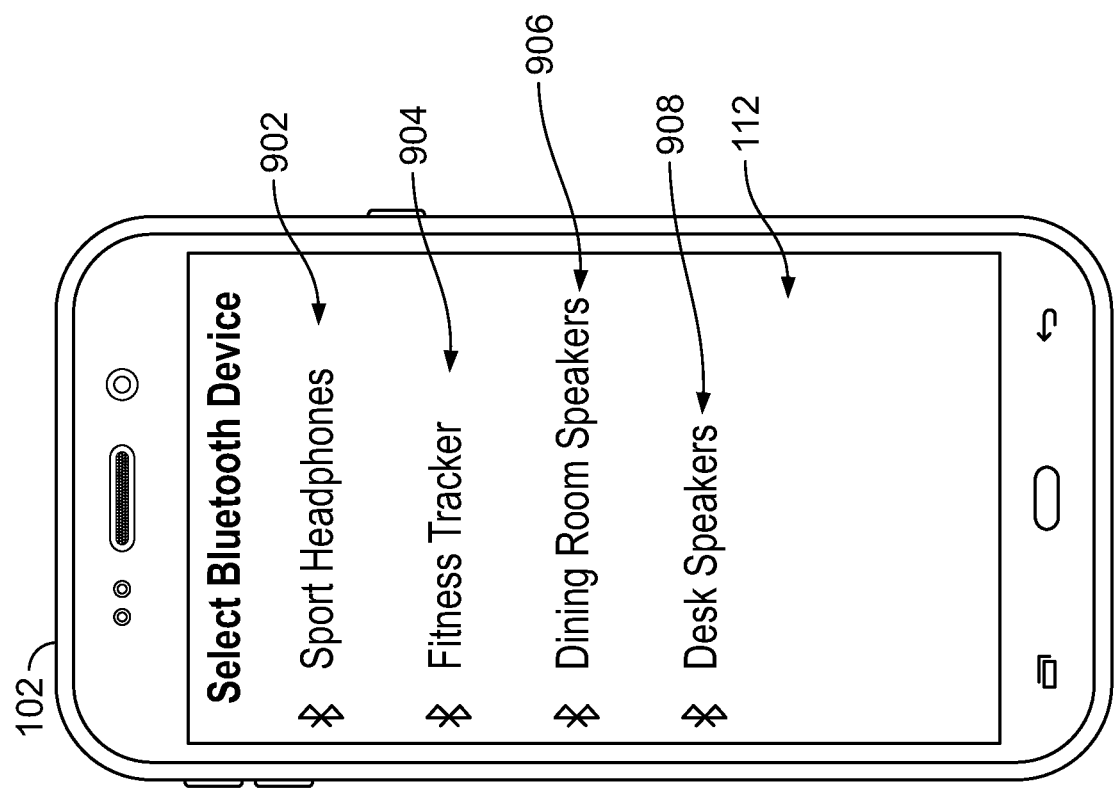
FIG. 9 shows an example display of a user interface for selecting further context parameters on the media-playback device of FIG. 1.

In FIG. 9, the user interface displays options for available Bluetooth devices that the media-playback device 102 has connections with. In this example, the possible options include "Sport Headphones" 902, "Fitness Tracker" 904, "Dining Room Speakers" 906, and "Desk Speakers" 908. The user selects "Dining Room Speakers" 906 to set up a device in the user's dining room by detecting its Bluetooth connection.

Figure 10:
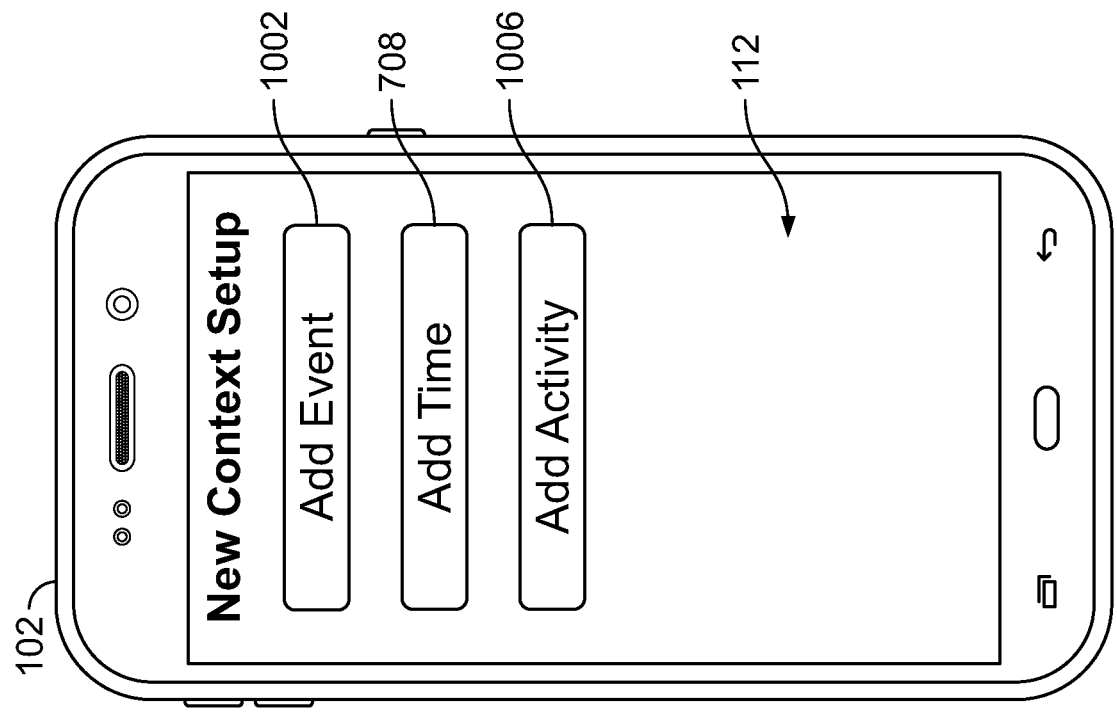
FIG. 10 shows another example display of a user interface for selecting a context type on the media-playback device of FIG. 1.

In some embodiments, the method 402 can loop back to operation 504 if additional parameters are desired to define the context. For example, as shown in FIG. 10, the user is prompted to provide another parameter type. Here, "Add Time" 708 is selected and the user interface 112 then prompts the user in FIG. 11 to provide time parameters for the context. The user is prompted to enter a time range in which the context will be active.

Figure 13:
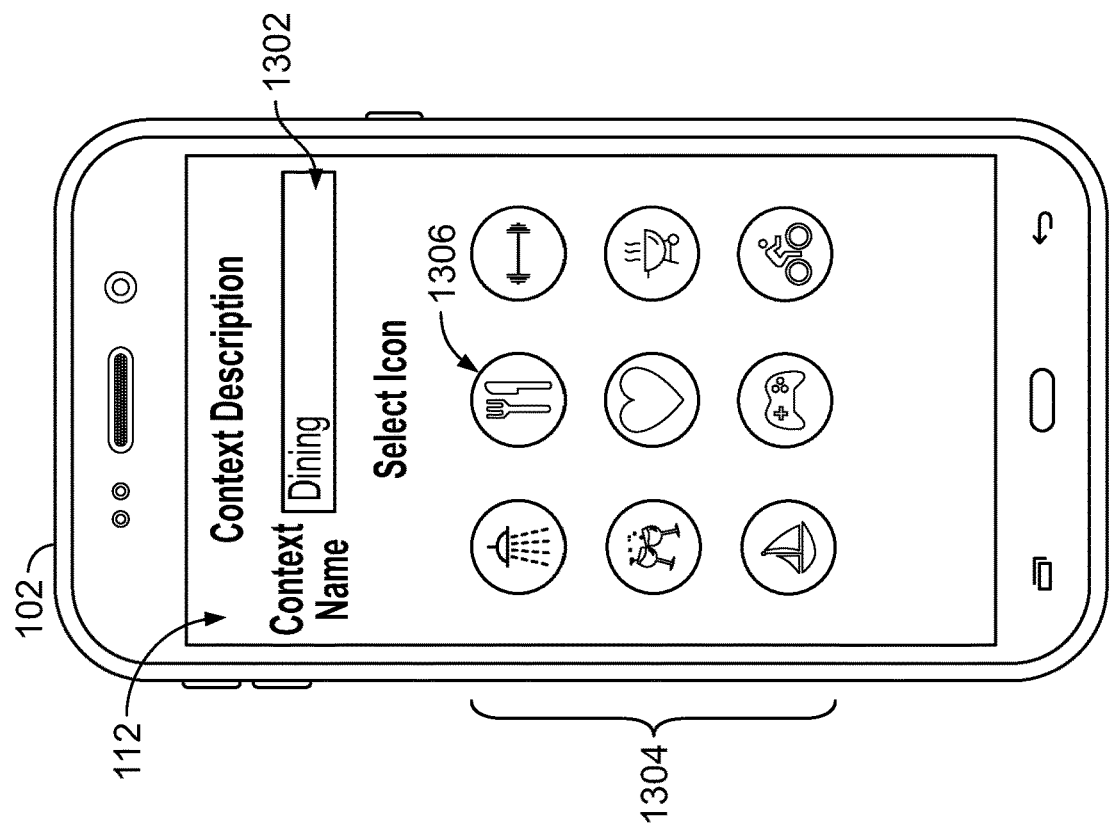
FIG. 13 shows an example display of a user interface for receiving selections of a context description on the media-playback device of FIG. 1.

FIG. 12 illustrates an example method 404 of receiving input to describe a context that is performed by some embodiments of the context-driven playback engine 108 and the media playback context application 186. At operation 1202, a prompt is displayed to input a title and image for the context. In some embodiments, the prompt is displayed on the user interface 112 of the media-playback device 102. FIG. 13 shows one example of such a display. FIG. 13 displays a title field 1302 and a plurality of images or icons 1304 are displayed for the user to choose from. In some embodiments, the icons 1304 are representative of activities and situations in which a user may desire to consumer particular media content. For example, a user may want an icon to represent showering, eating, lifting weights, drinking wine, a romantic situation, barbecuing, sailing, gaming, or biking, as represented by the icons 1304 in FIG. 13.

At operation 1204, title input is received. In the example of FIG. 13, the user has entered "Dining" to describe the context that was set up in FIGS. 6-11.

At operation 1206, a selection of an image is received. In the example of FIG. 13, the user selects the eating icon 1306 to represent the "Dining" context.

Figure 14:
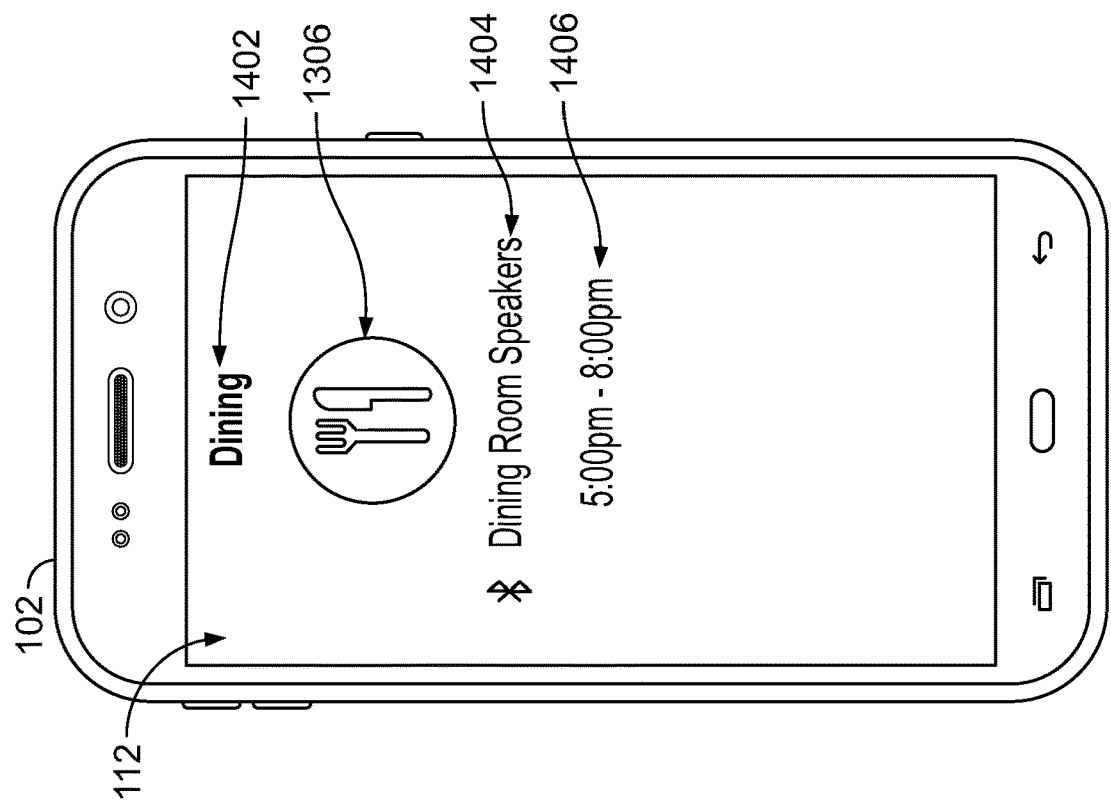
FIG. 14 shows an example display of a user interface for displaying a context description on the media-playback device of FIG. 1.

At operation 1208, the completed context description is optionally displayed. In the example of FIG. 14, the eating icon 1306 is displayed below the title 1402, "Dining," of the context. Also displayed are the first parameter 1404 and second parameter 1406 that were chosen for the context in FIGS. 6-11. In some embodiments, when media content has been added to the context, the media content identifying information may be displayed below the context description.

Figure 6:
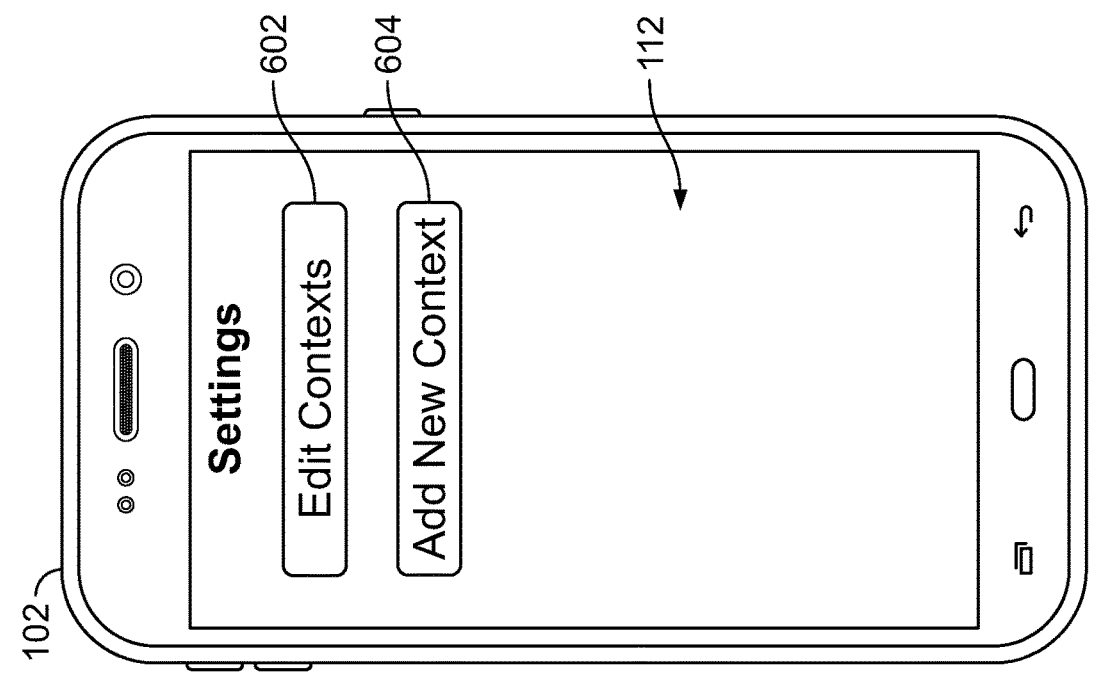
FIG. 6 shows an example display of a user interface for creating or editing a context on the media-playback device of FIG. 1.

In some embodiments, the context description can be edited by selecting the context from a menu in a settings display, such as the settings display in FIG. 6. The user could select the "Edit Contexts" button 602 to change the criteria or description for existing contexts.

Figure 15:
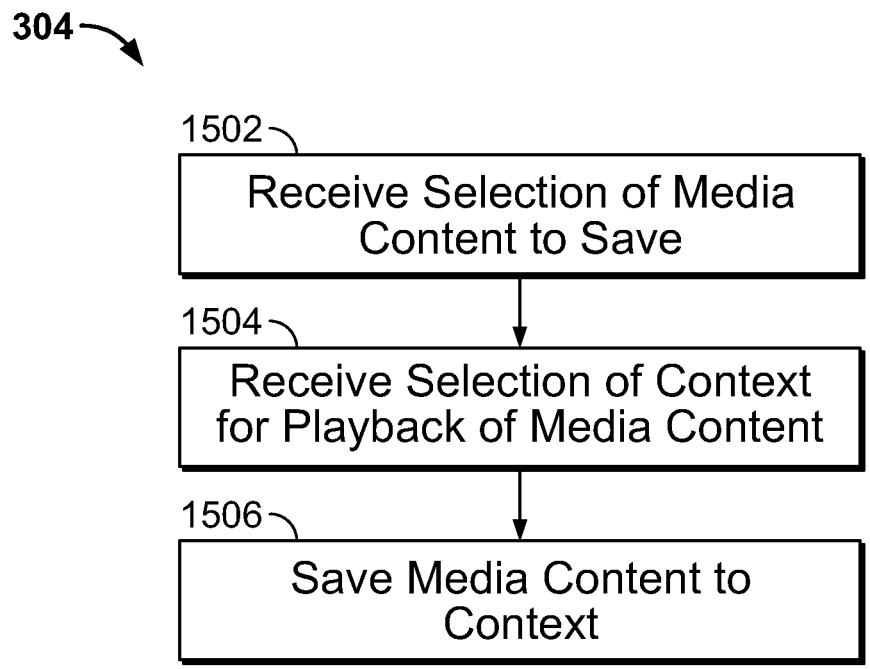
FIG. 15 illustrates an example method of saving media content to a context performed by some embodiments of the context-driven playback engine of FIG. 1.

FIG. 15 illustrates an example method 304 of saving media content to a context performed by some embodiments of the context-driven playback engine 108. In some embodiments, the method is performed in conjunction with the media playback context application 186.

At operation 1502, a selection of media content to save is received. At operation 1504, a selection of a context in which the media content is to be played later is received. At operation 1506, the media content is saved to the context. The method 304 is described further with respect to FIGS. 16-23.

Figure 16:
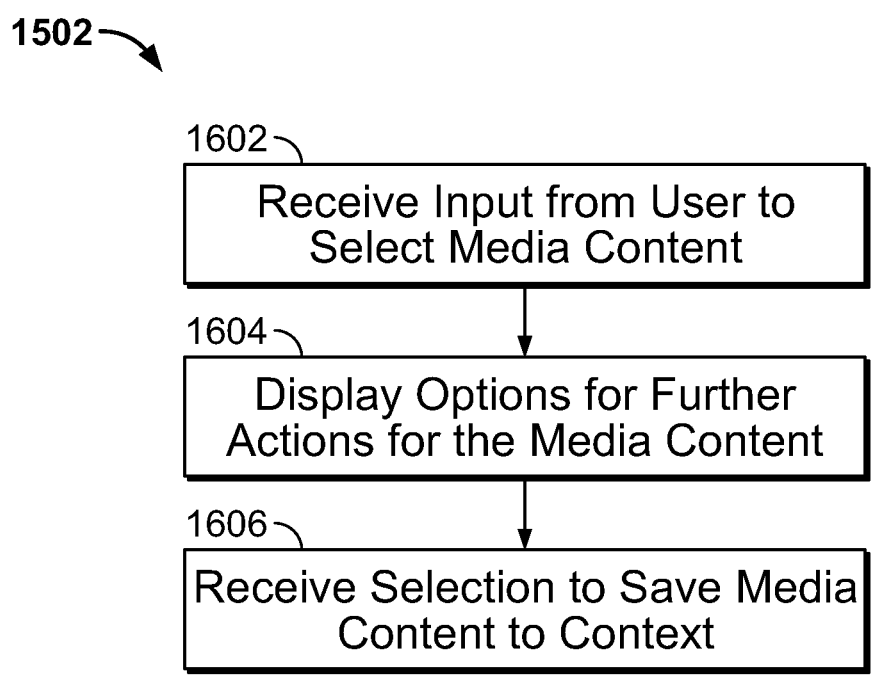
FIG. 16 illustrates an example method of receiving a selection to save media content to a context that is performed by some embodiments of the media-playback system of FIG. 1.

FIG. 16 illustrates an example method 1502 of receiving a selection to save media content to a context. As was discussed earlier, selections can be received from a user through a user interface 112 displayed on a touch screen 152. The media content can be an individual media content item such as a song or an episode of a podcast. The media content can also be a collection of media content items such as a playlist of songs, a genre of music, or a series of podcasts.

Figure 17:
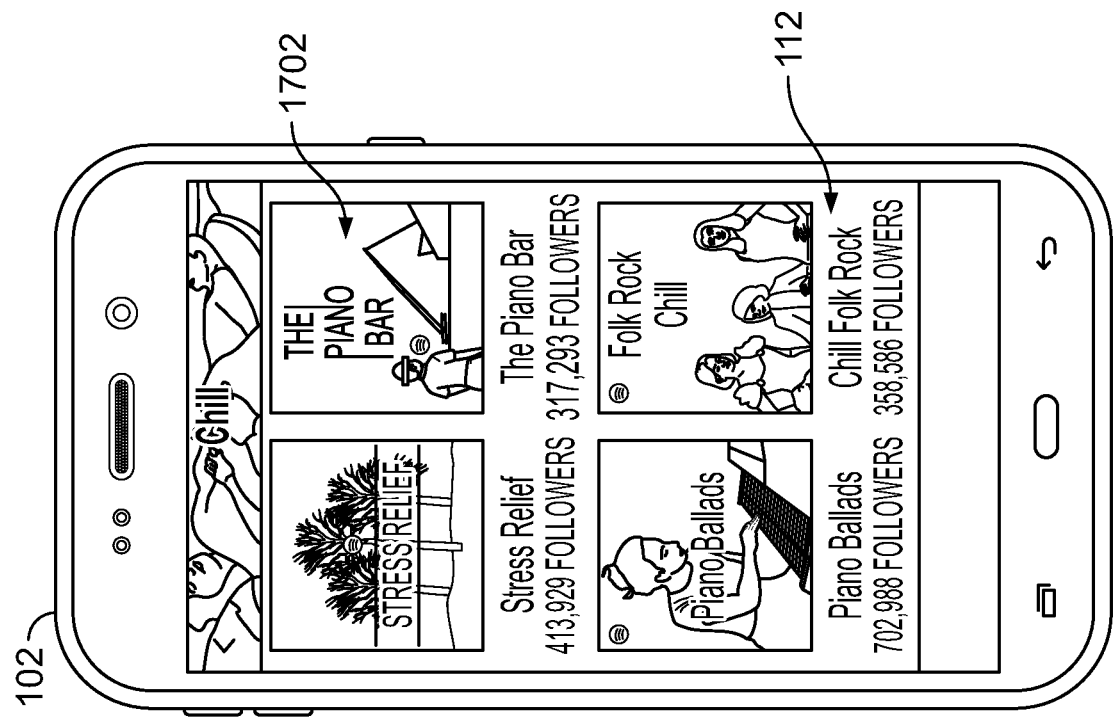
FIG. 17 shows an example display of a user interface displaying playlist options on the media-playback device of FIG. 1.

At operation 1602, input is received from a user selecting media content. In the example of FIG. 17, a user is browsing playlists within the mood of music titled "Chill." Various playlists including "The Piano Bar" playlist 1702 are displayed on the user interface 112 of the media-playback device. The user can simply touch the image associated with "The Piano Bar" playlist 1702 to select the playlist.

Figure 18:
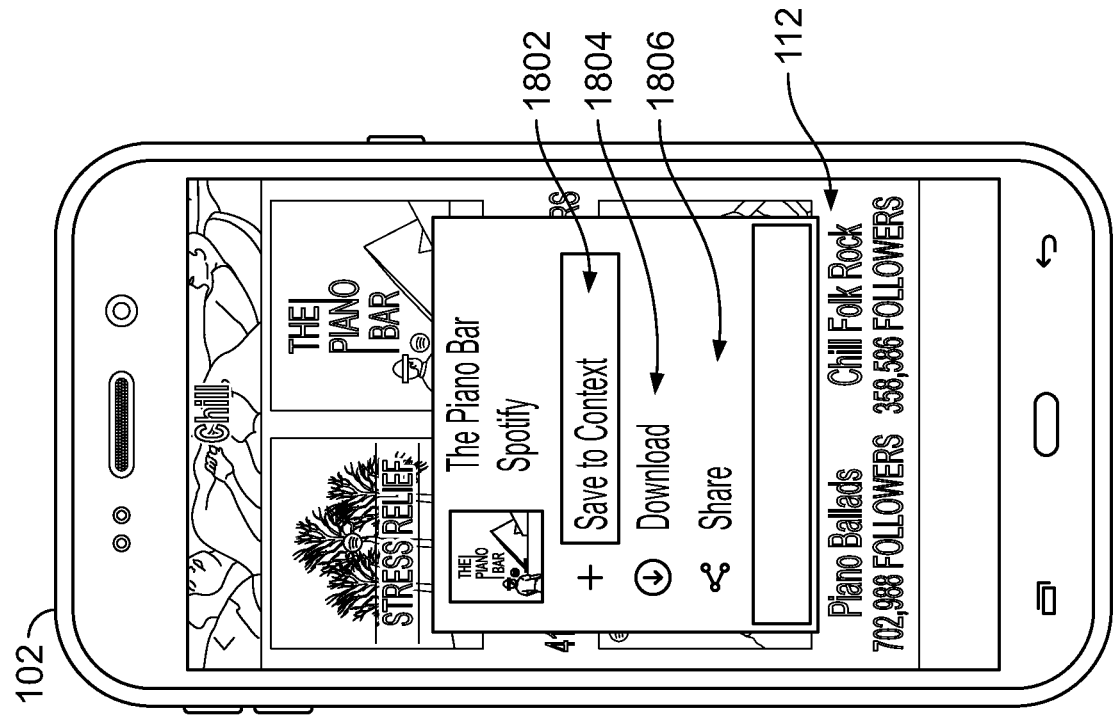
FIG. 18 shows an example display of a user interface displaying options for a playlist selection on the media-playback device of FIG. 1.

At operation 1604, options for further actions for the media content are displayed. In some embodiments, after the media content is selected, a menu will be displayed on the user interface 112 offering options of various actions that can be performed with the media content. In the example of FIG. 18, options to "Save to Context" 1802, "Download" 1804, and "Share" 1806 the playlist "The Piano Bar" are displayed. Selecting "Save to Context" 1802 will result in options for selecting a context to be displayed, as described in FIG. 22. Selecting "Download" 1804 will download the media content items within the playlist to the memory device 156 of the media-playback device 102. Selecting "Share" 1806 will prompt the user to choose a person to share the media content identifying information with.

At operation 1606, a selection to save the media content to a context is received. The context-driven playback engine 108 receives the input from a user and communicates the media context association engine 220 to access information about available contexts from the context data store 222.

Figure 20:
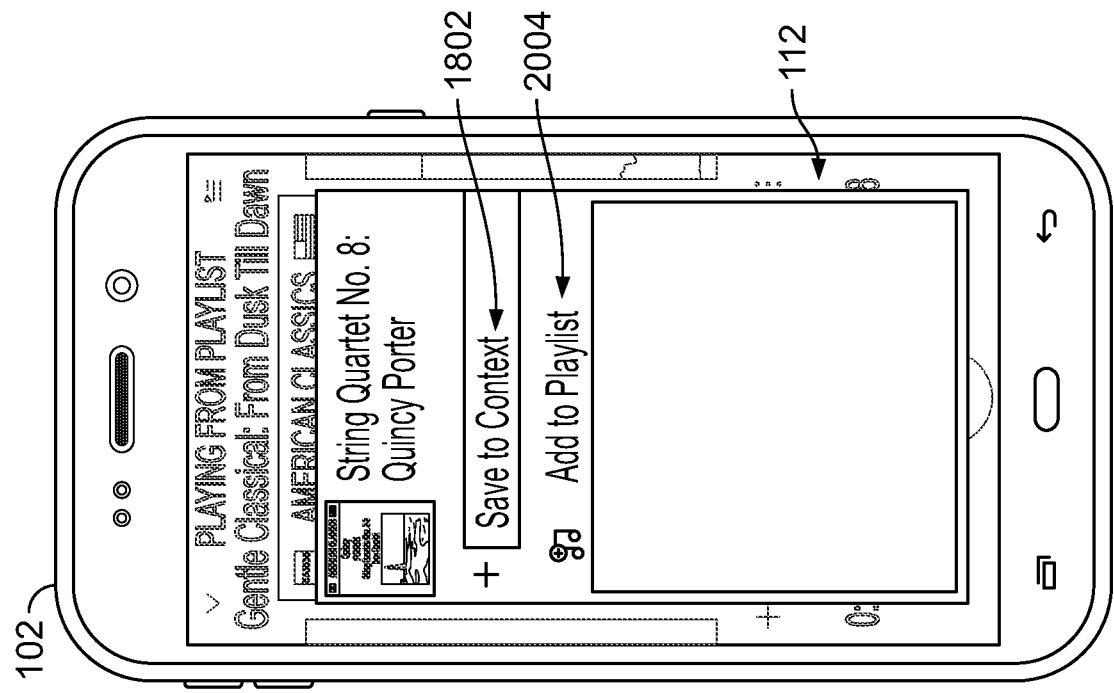
FIG. 20 shows an example display of the user interface of FIG. 19 after a song is selected.
Figure 19:
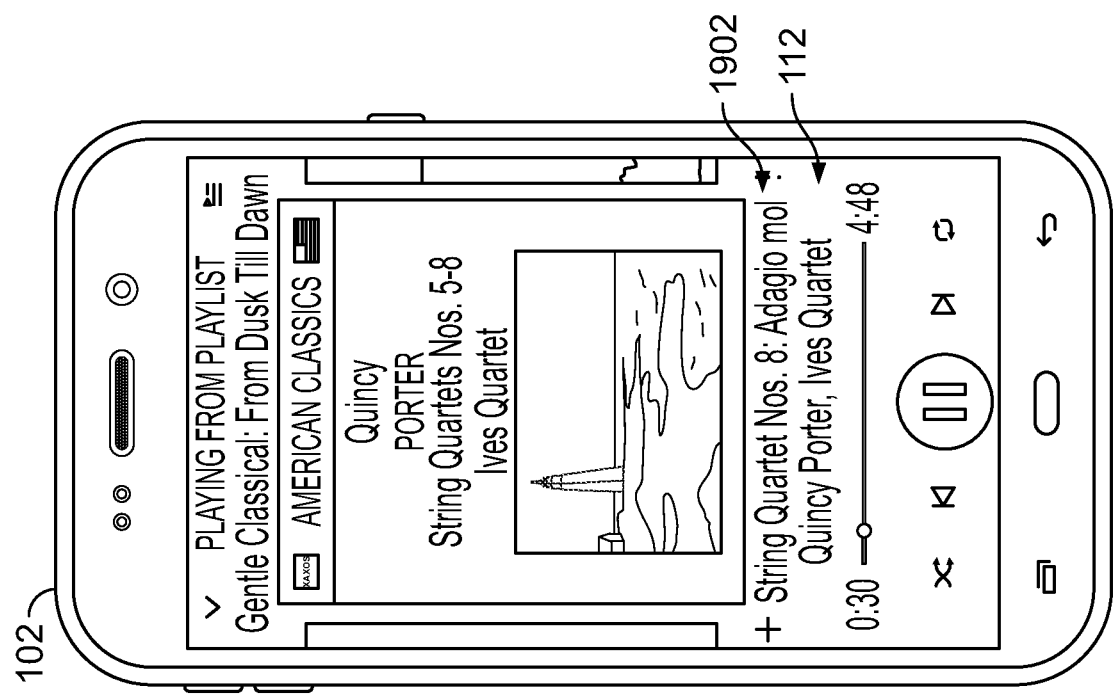
FIG. 19 shows an example display of a user interface when a song is being played on the media-playback device of FIG. 1.

FIGS. 19-20 illustrate another example of selecting media content to save to a context. FIG. 19 shows an example display of the user interface 112 when a song is being played on the media-playback device 102. To select the media content item "String Quartet No. 8," a user selects the song 1902.

FIG. 20 shows an example display of the user interface 112 after the song 1902 was selected. Options for further actions for the song 1902 are presented including "Save to Context" 1802 and "Add to Playlist" 2004. By selecting "Save to Context" 1802, the user interface 112 will proceed to the display described in FIG. 22. By selecting "Add to Playlist" 2004, the user will then be prompted to choose an existing playlist to add the song to.

Figure 22:
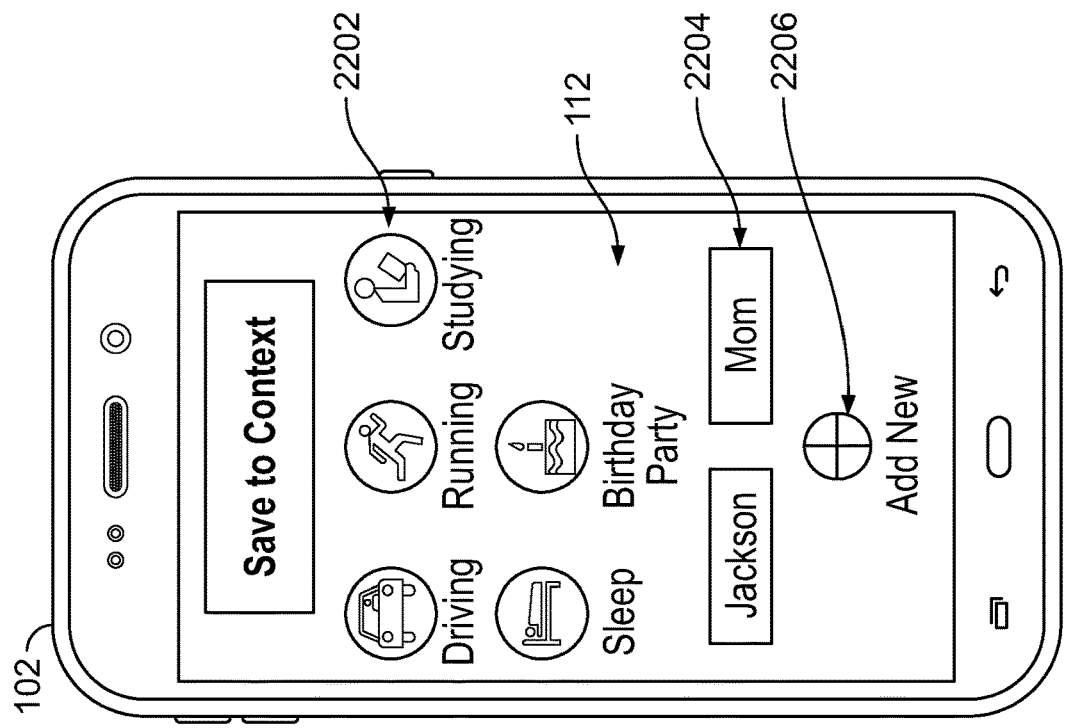
FIG. 22 shows an example user interface displaying options of contexts to which media content can be saved implemented on the media-playback device of FIG. 1.
Figure 21:
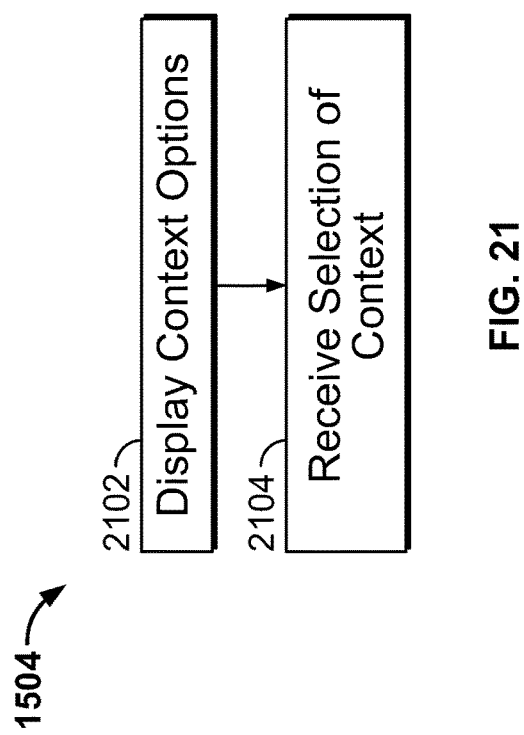
FIG. 21 illustrates an example method of receiving a selection of a context in which media content will be played that is performed by some embodiments of the media-playback system of FIG. 1.

FIG. 21 illustrates an example method 1504 of receiving a selection of a context in which media content will be played. At operation 2102, context options are displayed. FIG. 22 shows an example user interface 112 displaying options of contexts to which media content can be saved. In this example, various icons 2202 are displayed representing contexts such as "Driving," "Running," and "Studying." Context options for people are displayed as names 2204 including "Jackson" and "Mom" in the example of FIG. 22. An option to "Add New" 2206 context is also displayed. Selecting this option will initiate the method 402 described in FIGS. 5-14.

At operation 2104, a selection of a context is received from the user. Upon receiving the selection, the context-driven playback engine 108 initiates the method 1506 described in FIG. 23.

Figure 23:
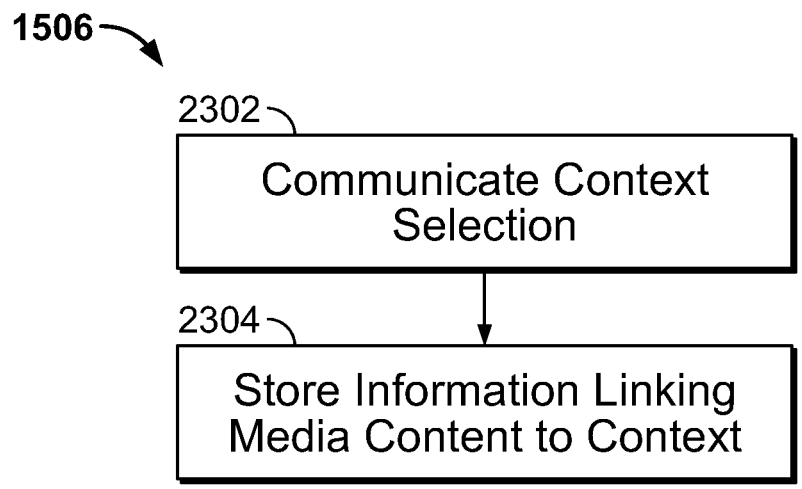
FIG. 23 illustrates an example method of saving media content to a context performed by some embodiments of the media-playback system of FIG. 1.

FIG. 23 illustrates an example method 1506 of saving media content to a context. In this method, the media content identifying information is saved in connection with the context information. In some embodiments, this information is saved at the media-playback device 102 in the memory device 156. In other embodiments, the information is saved in the context data store 222 of the media-delivery system 104.

At operation 2302, the context selection is communicated. In some embodiments, the context selection is communicated from the context-driven playback engine 108 to the media context association engine 220.

At operation 2304, the information linking the selected media content to the selected context is stored. In some embodiments, the linking information is stored at the context data store 222 of the media-delivery system 104. In other embodiments, the linking information is stored in the memory device 156 of the media-playback device. The linking information can be a tag or other metadata that labels the identifying information for one or more media content items to indicate their association with a particular context. In another embodiment, the links between media content and contexts can be recorded as lists associated with each context wherein the media content is listed according to its identifying information, such as a song ID.

Figure 24:
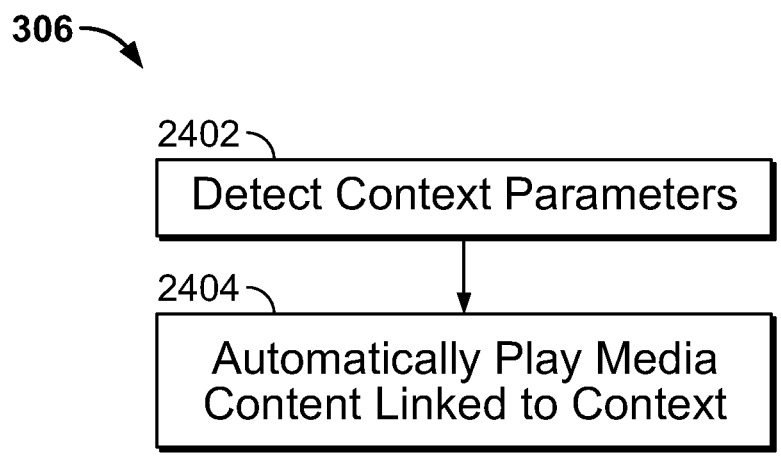
FIG. 24 illustrates an example method of automatically playing saved media content upon detection of a context that is performed by some embodiments of the media-playback system of FIG. 1.

FIG. 24 illustrates an example method 306 of automatically playing saved media content upon detection of a context that is performed by some embodiments of the context-driven playback engine 108. In some embodiments, a context is detected after a period of time has passed after saving media content to a context, as was described in relation to FIGS. 15-23. Preferably, playback of the saved media content initiates immediately and automatically upon detection of the context, based on the parameters established by a user.

At operation 2402, context parameters are detected. At operation 2402, the media content linked to the context is automatically played. This method is described further in FIGS. 25-30.

Figure 25:
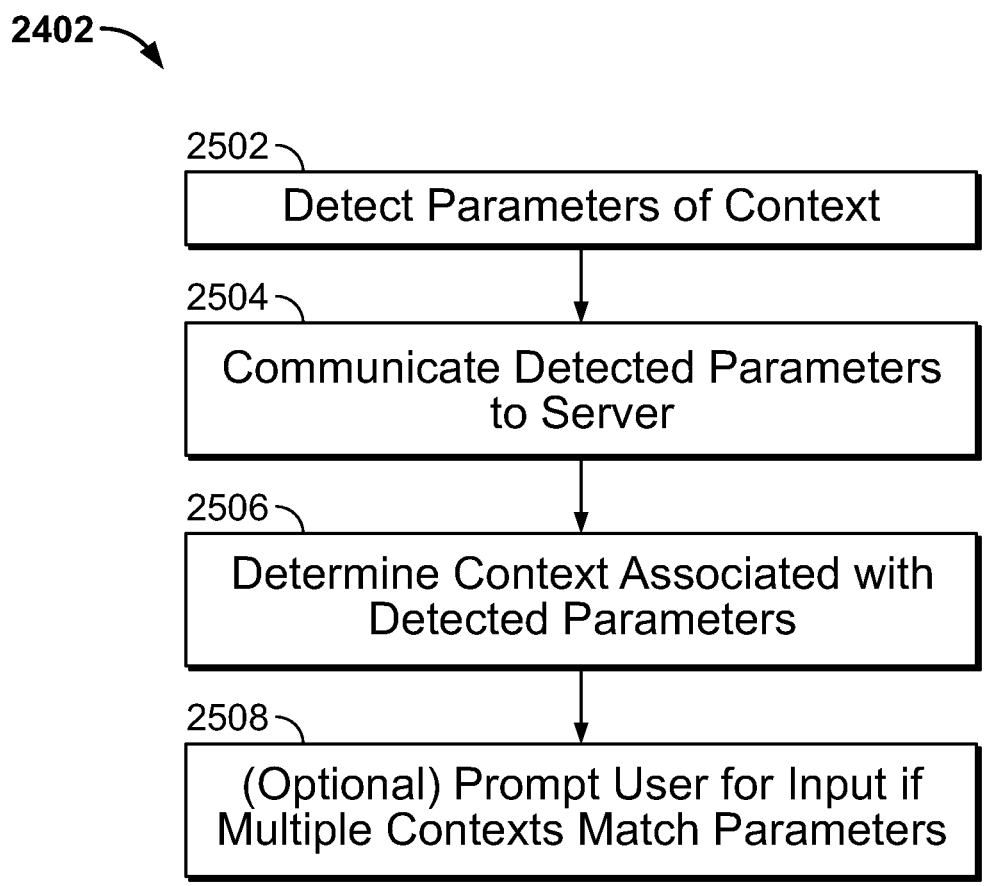
FIG. 25 illustrates an example method of detecting parameters associated with a particular context that is performed by some embodiments of the media-playback system of FIG. 1.

FIG. 25 illustrates an example method 2402 of detecting parameters associated with a particular context. Parameters include external input that is received by the media-playback device 102 such as location, time, devices, and activities. These parameters are the same criteria that were established when the context was set up as was described with respect to FIGS. 4-14. In some embodiments, the context detecting device 171 operates in conjunction with one or more of the location-determining device 150, touch screen 152, movement-detecting device 160, network access device 162, sound-sensing device 164, and optical-sensing device 166 to detect the context parameters established by the user.

Figure 26:
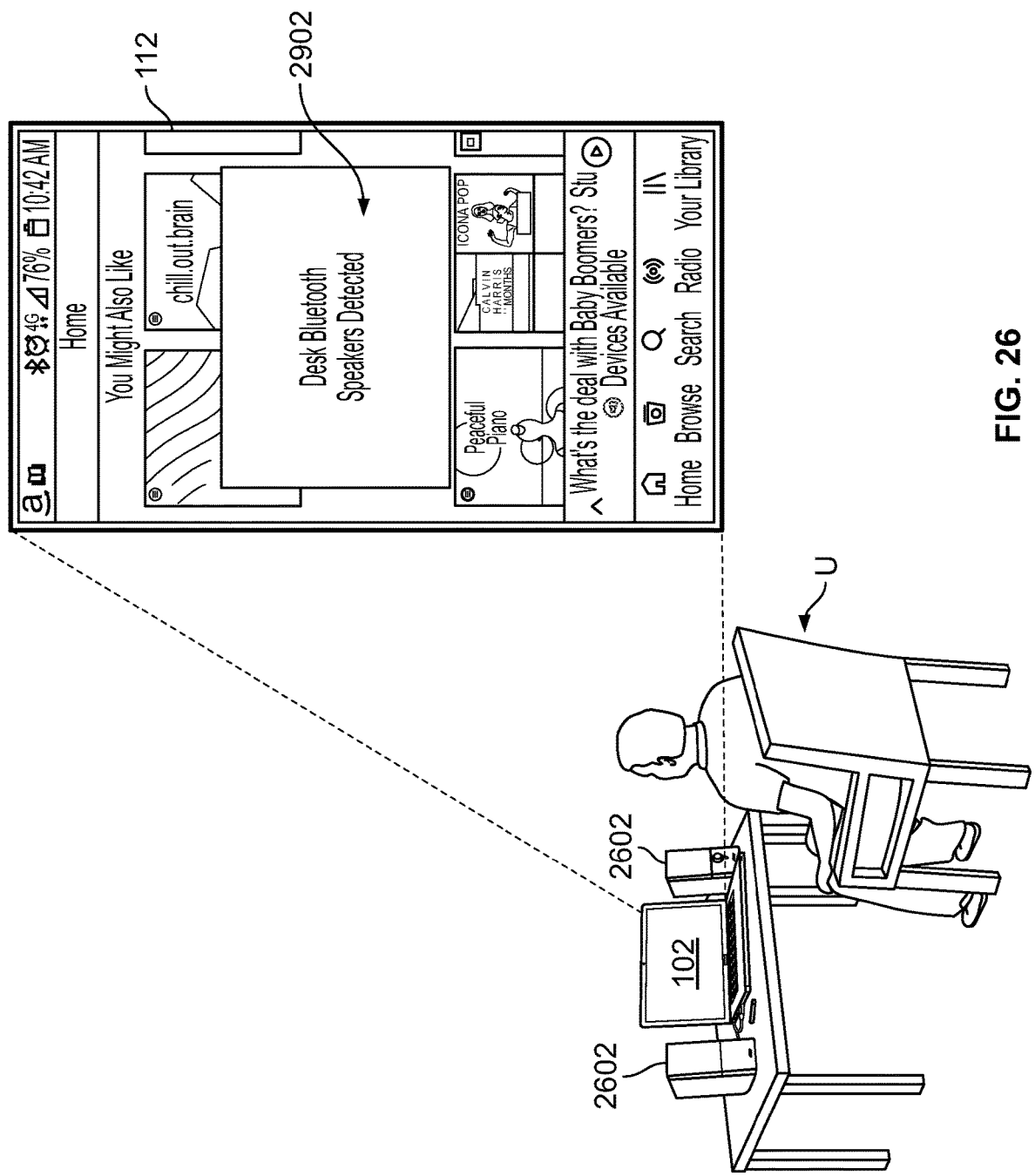
FIG. 26 shows an example of context parameters being detected in a studying context according to the method of FIG. 25.

At operation 2502 parameters of a context are detected. In the example of FIG. 26, the user U and his or her media-playback device 102, which in this example is a laptop computer, are at a desk. A pair of Bluetooth speakers 2602 are present and are detected by establishing a connection with the network access device 162 of the media-playback device 102. Therefore, in this situation, the context parameter that is detected is the connection with the Bluetooth speakers 2602. In some embodiments, one of the context parameters could be to determine which media-playback device the user U is using to play media content. In this example, the user U could have specified that when the user's laptop is being utilized to play media content and when the laptop is connected to the user's Bluetooth speakers, media content appropriate for the context of "Studying" should be played. In some embodiments, upon detecting the selected context, the user interface 112 displays a confirmation message 2902. In the example of FIG. 26 the confirmation message 2902 reads "Desk Bluetooth Speakers Detected" to indicate that criteria for a context has been detected.

At operation 2504, the detected parameters are communicated. In some embodiments, the parameters are communicated from the context-driven playback engine 108 to the media playback context application 186.

At operation 2506 the context associated with the detected parameters is determined. In some embodiments, the detected parameters are communicated to the media context association engine 220 which compares the parameters with those stored in the context data store 222. One or more matching contexts are identified.

At operation 2508, the user is optionally prompted to provide input if more than one context matches the detected parameters. In some instances, the same context parameters may be provided for more than one context. For example, the parameter of detecting a home Wi-Fi connection could apply to a kitchen context or a bedroom context. In such instances, the user may be prompted to provide input to distinguish between the two contexts.

Figure 27:
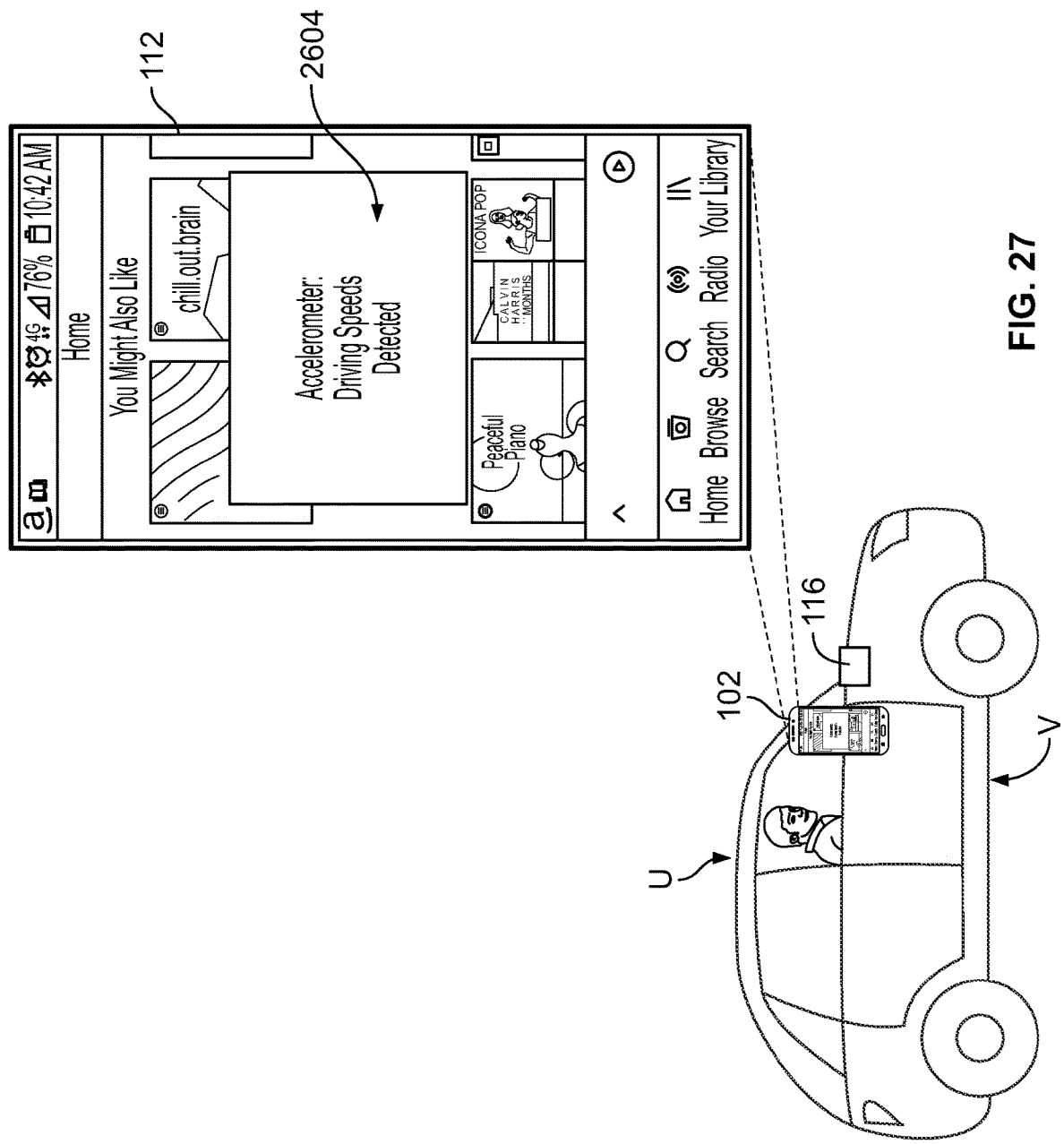
FIG. 27 shows another example of context parameters being detected in a driving context according to the method of FIG. 26.

FIG. 27 illustrates another example of the method 2402 of detecting parameters associated with a particular context. In this example, the user U is driving his or her vehicle V and his or her media-playback device 102 has connected to the vehicle media-playback system 116 via Bluetooth. Detecting the vehicle media-playback system 116 via Bluetooth as a context parameter leads the media context association engine 220 to determine that the user U and the media-playback device 102 are in the context of "Driving" by matching the parameter with contexts stored in the context data store 222.

Figure 28:
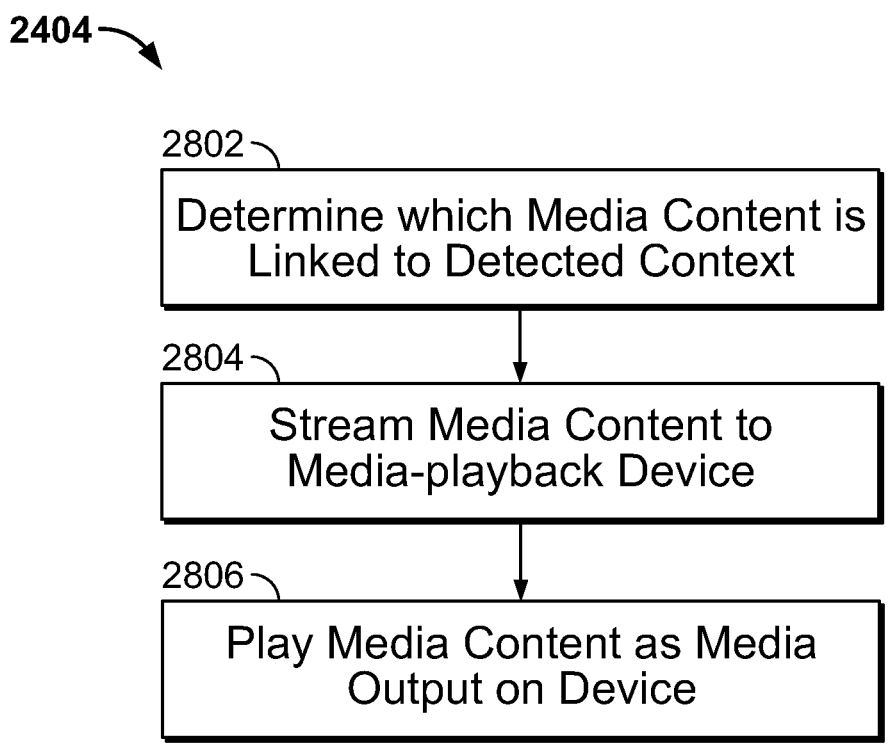
FIG. 28 illustrates an example method of automatically playing media content linked to a context that is performed by some embodiments of the media-playback system of FIG. 1.

FIG. 28 illustrates an example method 2404 of automatically playing media content linked to a context. At operation 2802, media content linked to the detected context is determined. After determining which context the media-playback device 102 is in, the media context association engine 220 references the context data store 222 to determine which media content is associated with the context. In some embodiments, each context is associated with a list of media content identification information for media content items that the user previously saved to the context.

At operation 2804, the media content identified in operation 2802 is streamed from the media server application 184 to the media-playback engine 170. In some embodiments, the media stream service 194 is utilized to communicate stream media 218 through the network 106 to the media-playback engine 170. In other embodiments, the media content is accessed from the media content cache 172 of the media-playback device 102.

Figure 29:
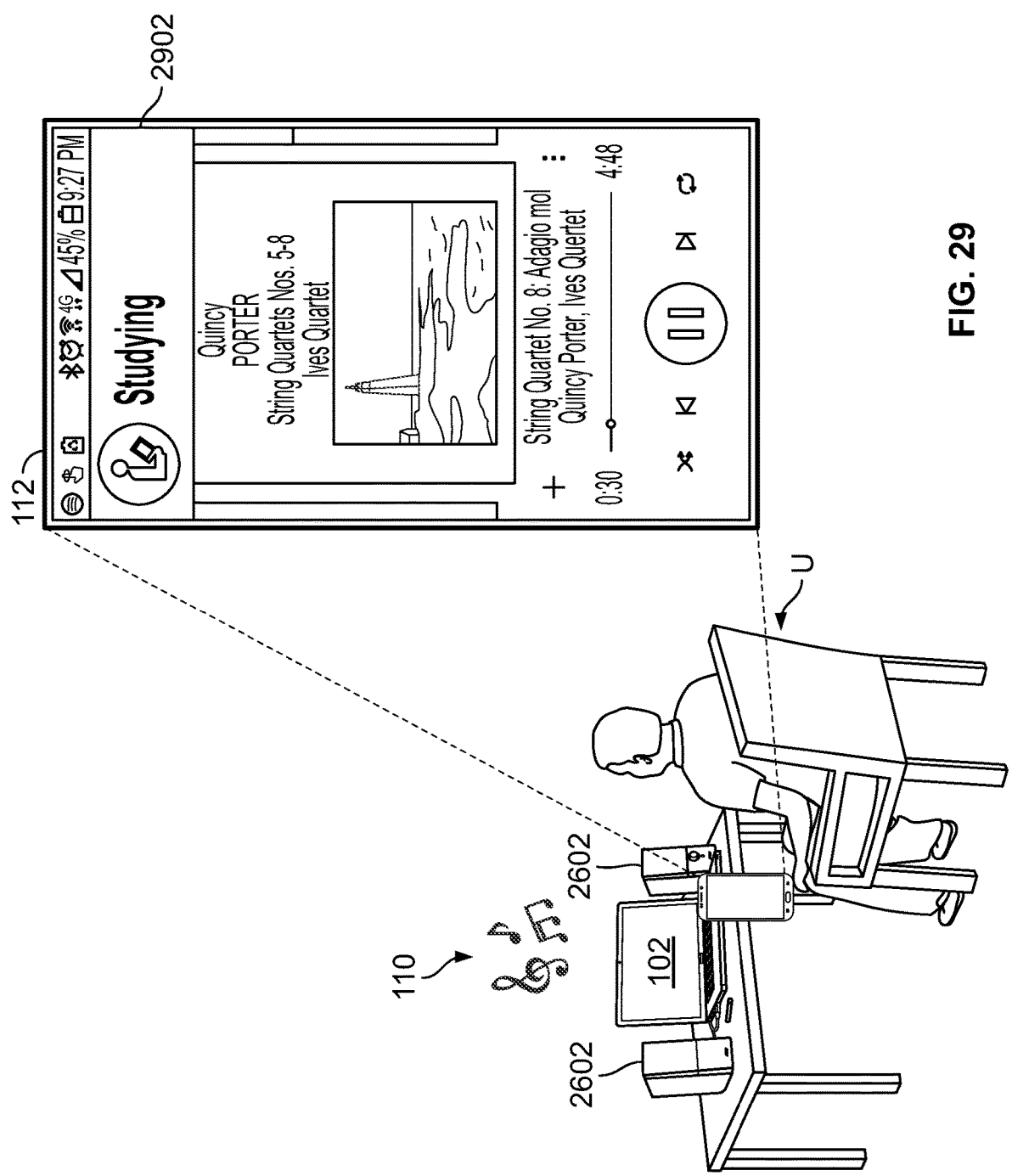
FIG. 29 shows an example of media content automatically playing in a studying context according to the method of FIG. 28.

At operation 2806 the media content is played as media output. In some embodiments, the content output device 158 of the media-playback device 102 plays the media content as media output 110 for the user U to consume in the specified context. In the example of FIG. 29, which follows in sequence from FIG. 26, the user U is still at a desk with the laptop 102. The user interface 112 indicates that media content for the context of "Studying" 2902 is being played through the Bluetooth speakers 2602 as media output 110. The song "String Quartet No. 8," which was saved in FIGS. 19-20 is now being played in the preferred setting for the user U, which is for the activity of studying.

Figure 30:
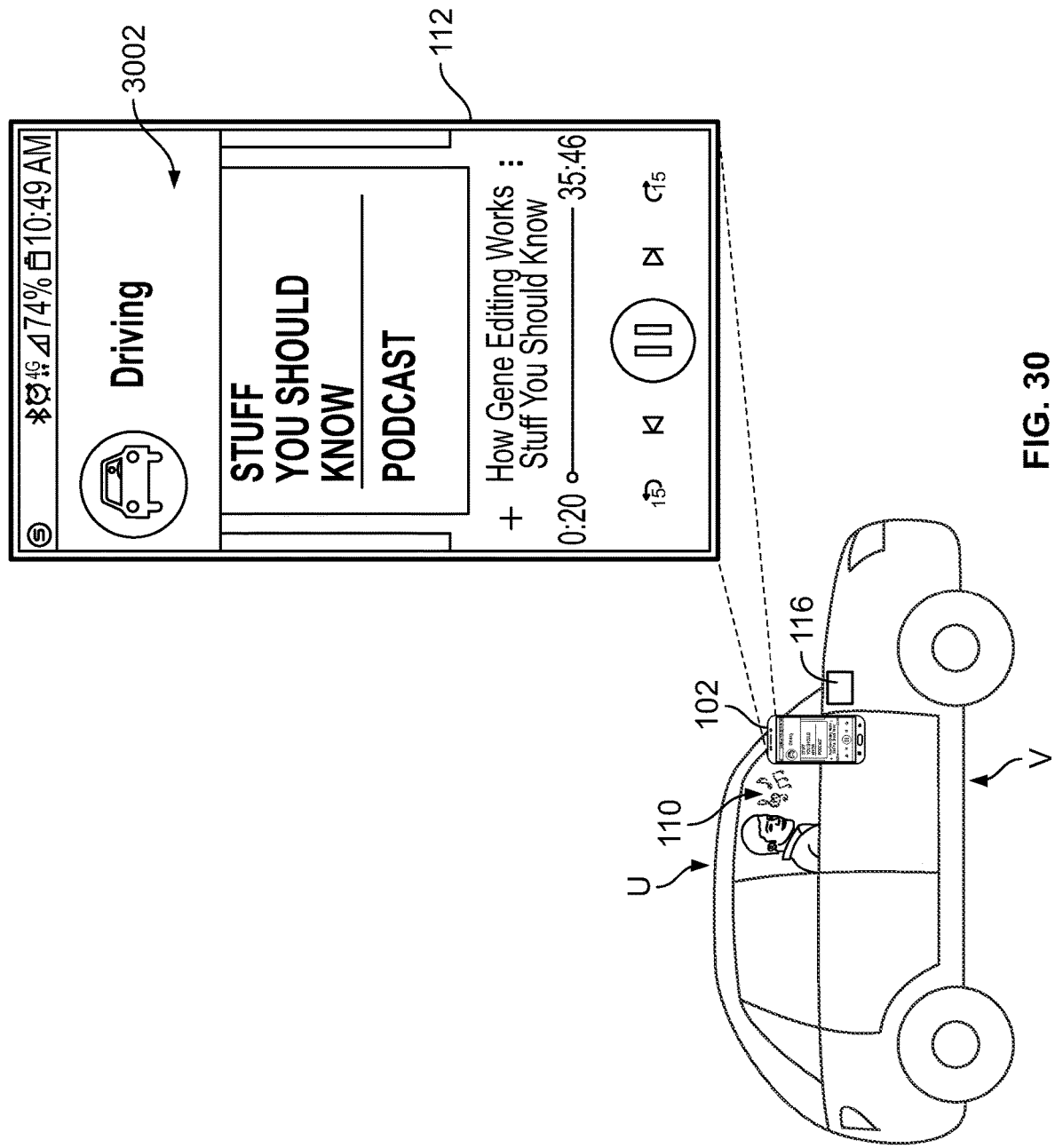
FIG. 30 shows another example of media content automatically playing in a driving context according to the method of FIG. 28.

FIG. 30 illustrates another example of the method 2404 of automatically playing media content linked to a context. FIG. 30 follows in sequence from FIG. 27 where the user U is driving in the vehicle V. The user interface 112 indicates that media content for the context of "Driving" 3002 is being played through the vehicle media-playback system 116 as media output 110. The podcast "Stuff You Should Know" is being played in the preferred setting for the user U, which is for the activity of driving.

Multiple combinations of contexts, context parameters, detection methods, devices, and media content are possible. The examples provided herein are merely illustrative. Other embodiments and variations are possible. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A media playback device for saving media content to a context for later playback, the media playback device comprising:
   a context detecting device configured to detect activity indicating that the media playback device is in a particular situation;
   a processing device;
   a memory device encoding instructions that, when executed by the processing device, cause the media playback device to:
      setup a user activity context, including to:
         receive at least one context detection parameter usable to identify that the media playback device is in the user activity context; and
         receive a context description from a user input, including a label for the user activity context;
      receive a selection of a media content;
      receive a selection to save the media content for later playback when the media playback device is in the user activity context, including to display a plurality of contexts and receive a selection of the user activity context from the plurality of contexts; and
      record identification information for the media content in a list linked to the user activity context in a context data store.

2. The media playback device of claim 1, wherein the instructions further cause the media playback device to:
   detect that the at least one context detection parameter indicates that the media playback device is in the user activity context; and
   automatically play one or more media content items identified within the list linked to the user activity context.

3. The media playback device of claim 1, wherein the context detecting device is configured to receive external input comprising one or more of a connection to a content output device, motion, light, sound, user input, a time range, and GPS location.

4. The media playback device of claim 1, wherein the context detecting device comprises one or more of a location-determining device, a movement-detecting device, a network access device, a sound-sensing device, an optical-sensing device, and a touch screen.

5. The media playback device of claim 1, wherein the instructions that cause the media playback device to setup a new user activity context further cause the media playback device to: receive a selection of one or more context types, the context type being selected from a device, an event, a person, a time, a location, and an activity.

6. The media playback device of claim 1, wherein the context description includes one or more of a title, an image, a brief description, a video, and a sound.

7. The media playback device of claim 1, wherein the media content is one or more of a song, an album, a playlist, an artist, a genre, a news story, a podcast, an audiobook, a radio station, and a video.

8. The media playback device of claim 1, wherein the user activity context is associated with one or more of: a time, a geographic location, an event, a device, a person, and an activity.

9. The media playback device of claim 1, wherein the user activity context is a combination of two or more of a time, a geographic location, an event, a device, a person, and an activity.

10. The media playback device of claim 1, wherein the selection of the media content is received as a voice command.

11. A method of saving media content to a context for later playback on a media playback device comprising:
setting up a user activity context by:
receiving at least one context detection parameter usable to identify that the media playback device is in the user activity context; and
receiving a context description from a user input, including a label for the user activity context;
receiving a selection of a media content;
receiving a selection to save the media content for later playback when the media playback device is in the user activity context, including displaying a plurality of contexts and receiving a selection of the user activity context from the plurality of contexts; and
recording identification information for the media content in a list linked to the user activity context in a context data store.

12. The method of claim 11, further comprising:
detecting that the at least one context detection parameter indicates that the media playback device is in the user activity context; and
automatically playing one or more media content items identified within the list linked to the user activity context.

13. The method of claim 11, wherein the media content is one or more of a song, an album, a playlist, an artist, a genre, a news story, a podcast, an audiobook, a radio station, and a video.

14. The method of claim 11, wherein the user activity context is one or more of: a time, a geographic location, an event, a device, a person, and an activity.

15. The method of claim 11, wherein the user activity context is a combination of two or more of a time, a geographic location, an event, a device, a person, and an activity.

16. The method of claim 11, wherein the media playback device comprises a context detecting device configured to detect activity indicating that the media playback device is in a particular situation.

17. The method of claim 16, wherein the context detecting device comprises one or more of a location-determining device, a movement-detecting device, a network access device, a sound-sensing device, an optical-sensing device, and a touch screen.

18. The method of claim 12, wherein detecting that the media playback device is in the user activity context comprises wirelessly connecting to a device and identifying a context associated with the device.

19. The method of claim 12, wherein detecting that the media playback device is in the user activity context comprises receiving accelerometer input indicating that a user carrying the media playback device is running.

20. A system for saving media content for later playback in a particular context comprising:
a media-delivery system comprising:
a media server application comprising a media stream service, a media data store, and a media application interface;
a media playback context application comprising a media context association engine and a context data store;
a processing device; and
a memory device encoding instructions that, when executed by the processing device, cause the media-delivery system to:
establish a new user activity context by causing the media-delivery system to:
receive, at the media context association engine, one or more context detection parameters and a context description from a user input, including a label for the new user activity context; and
save media content to the new user activity context by causing the media-delivery system to:
receive, at the media context association engine, a selection of one or more media content items and a selection to link media content identifiers of the one or more media content items to the new user activity context for later playback, wherein the selection to link media content identifiers is received in response to a display of a plurality of contexts and is based on selection of the user activity context from the plurality of contexts; and
record, with the media context association engine, the media content identifiers to a list associated with the new user activity context in the context data store.

21. The system of claim 20, wherein the instructions further cause the media-delivery system to:
identify and stream media content associated with the new user activity context to a mobile device, including to:
receive, at the media context association engine, at least one context detection parameter detected by the mobile device;
compare the at least one context detection parameter with stored context detection parameters in the context data store to identify that the mobile device is in the new user activity context;
identify, with the media context association engine, the list associated with the new user activity context;
communicate, from the media context association engine to the media data store, a command to access media content items associated with the media content identifiers in the list; and stream the media content with the media stream service to the mobile device for playback.

22. The system of claim 21, wherein the mobile device comprises:
   a context determining device;
   a content output device; and
   a sound sensing device configured to receive and process voice inputs.

* * * * *